United States Patent
Scapel et al.

(10) Patent No.: US 10,796,470 B2
(45) Date of Patent: Oct. 6, 2020

(54) OPTIMIZED AVATAR ASSET RESOURCE

(71) Applicant: Apple Inc., Cupertino, CA (US)

(72) Inventors: Nicolas V. Scapel, Sunnyvale, CA (US); Alexandre R. Moha, Los Altos, CA (US); Guillaume P. Barlier, San Mateo, CA (US); Thomas Goossens, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/283,610

(22) Filed: Feb. 22, 2019

(65) Prior Publication Data

US 2019/0371032 A1 Dec. 5, 2019

Related U.S. Application Data

(60) Provisional application No. 62/679,875, filed on Jun. 3, 2018.

(51) Int. Cl.
| | |
|---|---|
| *G06T 13/40* | (2011.01) |
| *G06T 9/00* | (2006.01) |
| *G06F 3/0484* | (2013.01) |

(52) U.S. Cl.
CPC .......... *G06T 13/40* (2013.01); *G06F 3/04845* (2013.01); *G06F 3/04847* (2013.01); *G06T 9/001* (2013.01)

(58) Field of Classification Search
CPC ..... G06T 13/40; G06T 9/001; G06F 3/04845; G06F 3/04847
See application file for complete search history.

(56) References Cited

U.S. PATENT DOCUMENTS

| | | |
|---|---|---|
| 8,614,714 B1 | 12/2013 | Koperwas et al. |
| 9,786,084 B1 | 10/2017 | Bhat et al. |
| 2017/0069124 A1* | 3/2017 | Tong ............... G06T 13/40 |
| 2019/0122411 A1* | 4/2019 | Sachs .............. G06T 17/20 |

FOREIGN PATENT DOCUMENTS

WO 2016161553 10/2016

OTHER PUBLICATIONS

Orvalho, Verónica Costa. "A System to Reuse Facial Rigs and Animations." ECAG 2008 Workshop Facial and Bodily Expressions for Control and Adaptation of Games. (Year: 2008).*
International Patent Application No. PCT/US2019/033180 , "International Search Report and Written Opinion", dated Nov. 8, 2019, 22 pages.

(Continued)

*Primary Examiner* — Yu Chen
(74) *Attorney, Agent, or Firm* — Kilpatrick Townsend & Stockton LLP

(57) ABSTRACT

Various customization options are provided for customizing a 3D avatar of a head. Features of the head and assets corresponding to the features can be customized using blend shapes. An amount of storage for the plurality of blend shapes is minimized by determining overlapping blend shapes that can be reused for a plurality of different assets. Further, techniques are provided for dynamic changes to an avatar in accordance with selected features and assets.

22 Claims, 20 Drawing Sheets

(56) References Cited

OTHER PUBLICATIONS

Ward et al., "A Survey on Hair Modeling: Styling, Simulation, and Rendering", IEEE Transactions on Visualization and Computer Graphics, vol. 13, No. 2, 2007, pp. 213-234.
International Patent Application No. PCT/US2019/033180 , "Invitation to Pay Additional Fees", dated Jul. 24, 2019, 16 pages.
U.S. Appl. No. 16/283,614 , "Notice of Allowance", dated Mar. 13, 2020, 10 pages.

\* cited by examiner

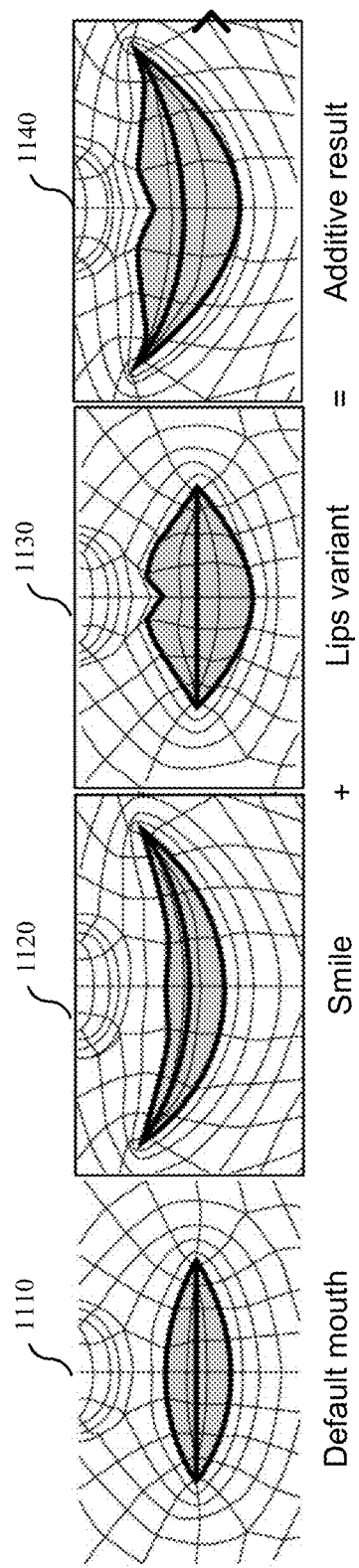
FIG. 11A Default mouth
FIG. 11B Smile
FIG. 11C Lips variant
FIG. 11D Additive result eye Blink + eye Squint = broken result + corrective shape = corrected deformation

ID

OPTIMIZED AVATAR ASSET RESOURCE

CROSS REFERENCES TO RELATED APPLICATIONS

The present application claims the benefit of and priority to U.S. Provisional Application No. 62/679,875, filed Jun. 3, 2018, the entire contents of which is incorporated herein by reference for all purposes.

FIELD

The present disclosure relates generally to reducing the amount of resources required to create an avatar on a mobile device. In particular, the disclosure relates to creating various options for creating an avatar while minimizing an amount of memory and runtime resources that are used on the mobile device.

BACKGROUND

A user of a mobile device may desire to create an avatar. An avatar can be a representation of a person, animal, or object. An avatar can be customized as desired by users. User's would like to have a variety of options for customizing an avatar. However, as the number of options for customizing an avatar increase, an amount of memory required to store the and provide the options increases. It is a drain on the resources of the mobile device to continuously have all the customization options available. A mobile device can have limited memory and processing capacity. Further, as the number of customization options increase, an amount of time required to load, change and display the avatar options also increases. This can result in delays in modifying and updating the avatar. Delays in loading and providing the customization options can also detract from the user experience.

Therefore, it is desired to provide a user with various avatar customization options while consuming minimal resources of a mobile device, such as memory space and processing time. Further, it is desired to quickly provide the user with various options for customizing an avatar without slowing down the mobile device and thus providing an enhanced user experience.

BRIEF SUMMARY

Example embodiments provide techniques for optimizing avatar asset resources. Specifically, in example embodiments, an avatar can be created which minimizes an amount of storage and processing required.

An example embodiment provides a method for optimizing asset resources. In accordance with an example embodiment, a mobile device can be configured to store a plurality of assets and a plurality of blend shapes corresponding with the plurality of assets for a plurality of features of an avatar. A plurality of features most frequently used by a user can be stored. The features that are most frequently used can be based on a history of user interaction with the avatar application. A user can input, on a user interface of the mobile device, a desired feature. The mobile device can receive a first feature selected by the user from among a plurality of features that can be customized by the user. The mobile device can identify a first set of the plurality of assets that correspond to the first feature. The mobile device can receive a selection of a first asset among the first set of the plurality of assets corresponding to the first feature and can identify a first set of the plurality of blend shapes that correspond to the first asset that is selected among the first set of the plurality of assets corresponding to the first feature.

The mobile device can also receive a selection of a second asset among the first set of the plurality of assets corresponding to the first feature and can identify a second set of the plurality of blend shapes corresponding to the second asset that is selected among the first set of the plurality of assets corresponding to the first feature. The one or more blend shapes of the first set of the plurality of blend shapes for the first asset can overlap with one or more blend shapes of the second set of the plurality of blend shapes for the second asset. Therefore, a same blend shape can be reused for a plurality of assets.

In accordance with another example embodiment, a user can input a desired hairstyle for an avatar. The user interface can receive a selection of a first hairstyle for an avatar of a head. A first set of zones on the avatar of the head, on which the first hairstyle is positioned, can be determined. The first set of zones can be selected from a plurality of possible zones for which hairstyles may be defined for the avatar. A first set of blend shapes for each of the first set of zones for the first hairstyle can be identified. The first set of blend shapes can relate to different directions of movement. First movement information for the head of the avatar can be received and a first movement of the first hairstyle can be stimulated using the first movement information. The simulation can be performed by a simulation engine that determines a linear combination of each first set of blend shapes based on the first movement information.

The mobile device can also receive a second hairstyle that the user would like to apply to the avatar. The user interface of the mobile device can receive a selection of a second hairstyle for the avatar of the head. A second set of zones on the avatar of the head on which the second hairstyle is positioned can be determined. The second set of zones can be selected from the plurality of possible zones for which hairstyles may be defined for the avatar. The second set of zones can include a first portion that are in the first set of zones and a second portion that are not in the first set of zones. A second set of blend shapes for the second hairstyle can be identified. The second set of blend shapes can correspond to the second set of zones and relate to the different directions of movement. Second movement information for the head of the avatar can be received and the simulation engine can simulate a second movement of the second hairstyle using the second movement information.

Other embodiments are directed to systems, portable consumer devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIGS. 11A-11D illustrate overlapping blend shapes, in accordance with some example embodiments.

DETAILED DESCRIPTION

In the following description, for the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

I. User Interface

A user may desire to create an avatar. The avatar can be a three-dimensional (3D) representation of a person, such as the user, an animal or an object. An avatar can be a partial representation (e.g., a representation of a head) and an avatar can be a complete representation (e.g, a whole body).

In the examples described, the avatar is of a three-dimensional head. However, aspects of the embodiments can be applied to avatars which are not limited to a head. A 3D avatar can provide a more realistic representation of a person or animal. Throughout the specification, the 3D avatar may also be referred to as the head of the avatar or the 3D head. The 3D avatar can also be known as a 3D emoji or 3D animated emoji. Motion capture from an imaging device can be used to create the animation.

The 3D avatar can be created through an avatar application. The avatar application can downloaded by a user to their mobile device or the avatar application and be installed in the mobile device at the time when the mobile device is manufacture. The application can be dedicated to the generation of an avatar or the application may include options for generating an avatar (e.g., gaming application). The application can be downloaded and stored on a mobile device by the user or the application can preinstalled on the mobile device. The mobile device can be, for example, a mobile phone, smartwatch or a tablet.

When the application is selected, the user can be provided with a user interface for generating an avatar. FIGS. 1A-1H illustrate example user interfaces for creating and customizing an avatar, in accordance with some example embodiments.

Figure 1B:
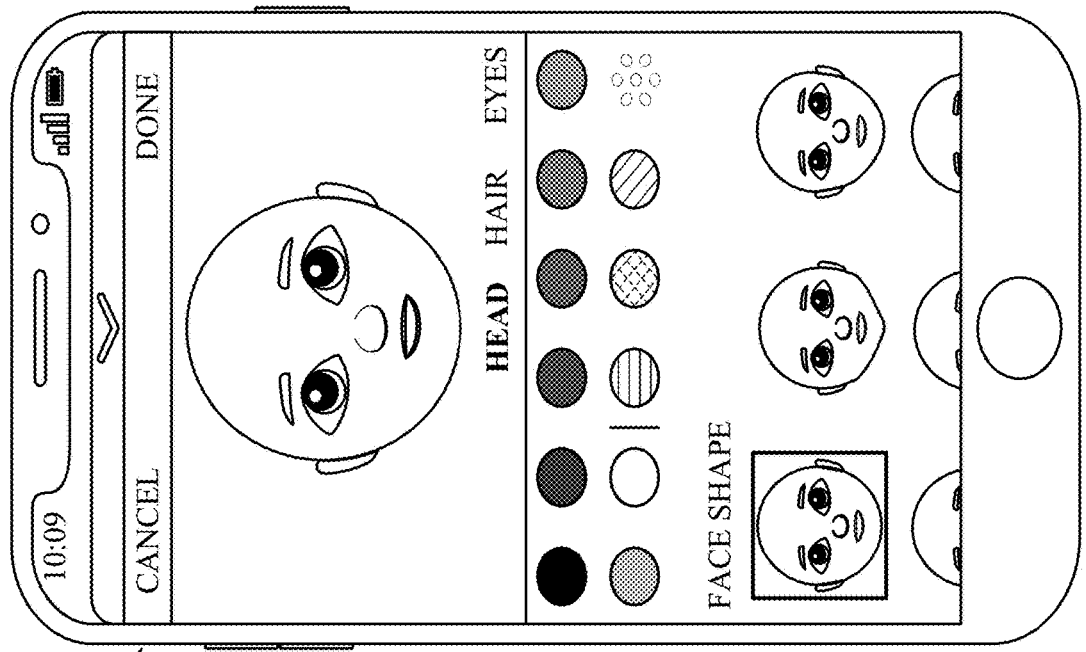
FIGS. 1A-1H illustrate example user interfaces for creating and customizing an avatar, in accordance with some example embodiments.
Figure 1A:
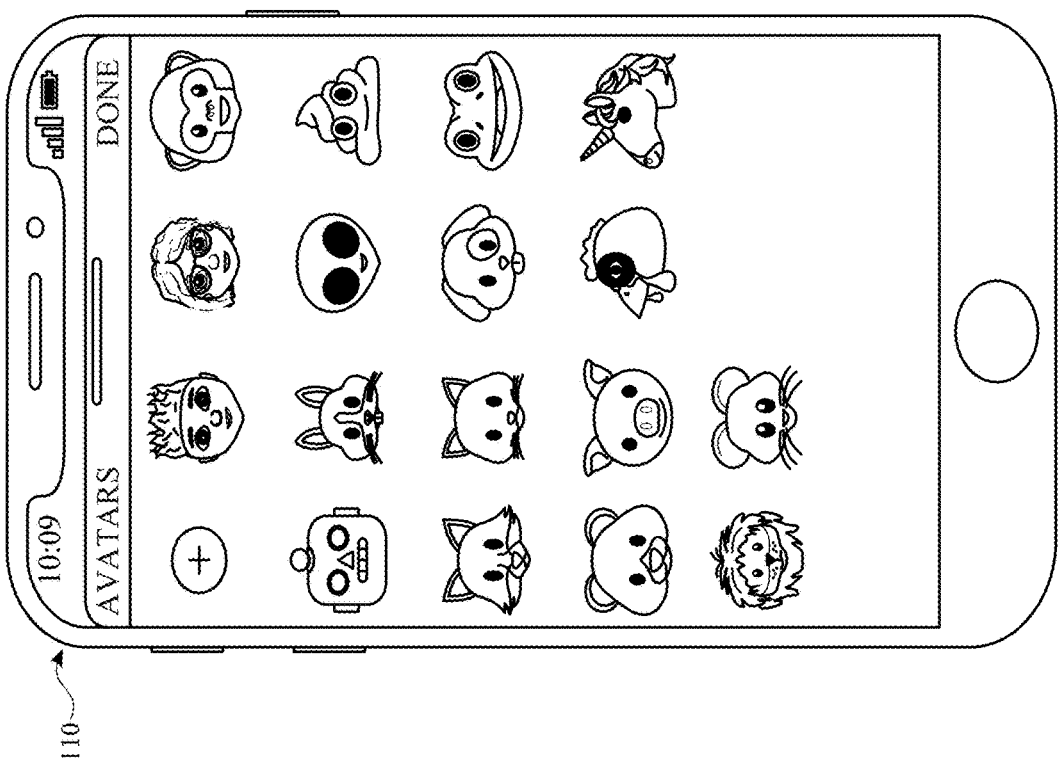

FIG. 1A illustrates a user interface 110 displaying options of avatars that can be customized by user. As shown in FIG. 1A, an avatar can be used to represent a human, animal, and/or objects. An avatar can be a realistic representation or can be a cartoonlike representation, such as an emoji. As shown in FIG. 1A, avatars can be directed to a human, such as a man or a woman, a monkey, a robot, a rabbit, an alien, the unicorn, etc. These are merely examples and avatars can be directed to various other animals, objects or things.

As shown in FIG. 1B, a user can customize various aspects of an avatars head. For example, a user can customize features. Features can refer to a general category of items that can be customized. Features on an avatar's head can include face shape, hair, eyes, nose, ears, mouth, and chin of an avatar. Each of the features can include subcategories of options that can be customized. For example, there can be different facial expressions, mouth expressions, eye expressions, accessories, hairstyles, etc. The subcategories for each of the features can be referred to as assets. In some instances, an asset can also be considered a feature and a feature can also be considered an asset.

Figure 1D:
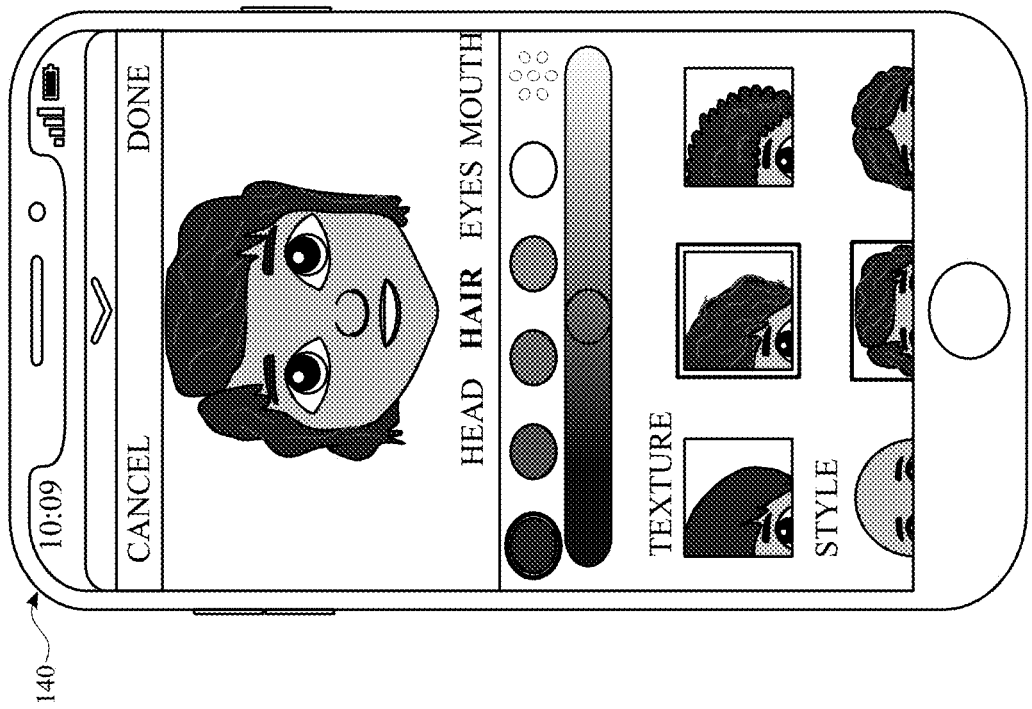
Figure 1C:
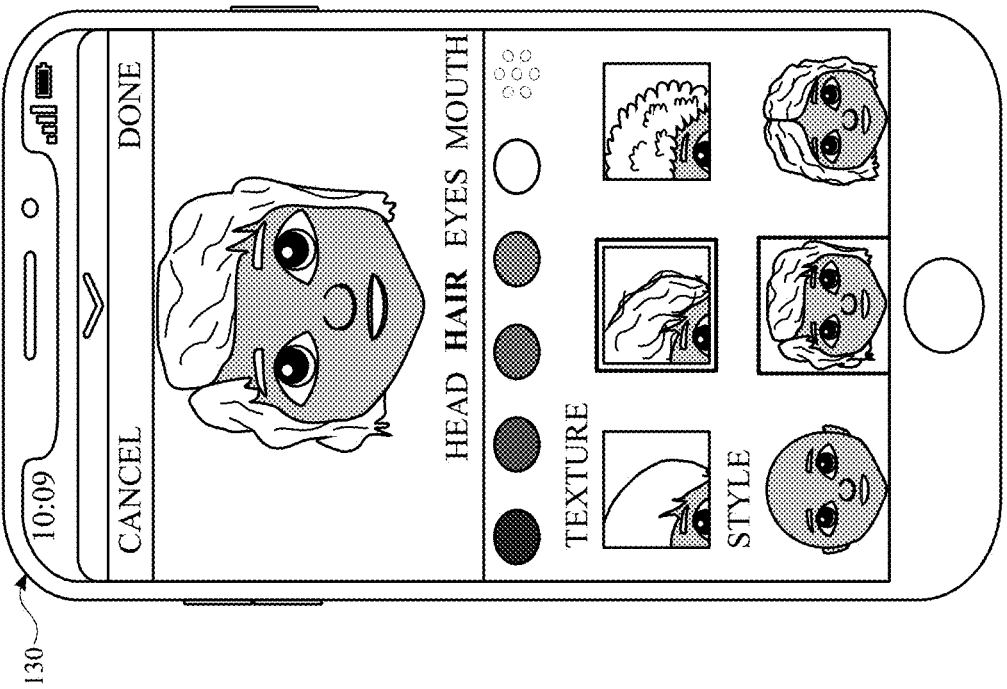

FIG. 1B illustrates a user interface 120 displaying ahead of an avatar based on a selected face shape. As shown in FIGS. 1C and 1D, hair texture, style and color can be customized. FIG. 1C illustrates a user interface 130 including an avatar with a lighter hair color. FIG. 1D illustrates a user interface 140 including an avatar with a darker hair color. The selection of the assets can be controlled by using, for example, a sliding bar. As the user slides the bar from left to right the hair color can change. Although a sliding bar is disclosed, selection of the assets can be controlled and selected other than through a sliding bar.

Another feature for a head is texture. FIGS. 1C and 1D illustrates different hair textures (e.g., flat, wavy, curly). A texture can include a flat image that is placed on the head of the avatar to indicate texture. The flat image can be a decal or a sticker.

Figure 1F:
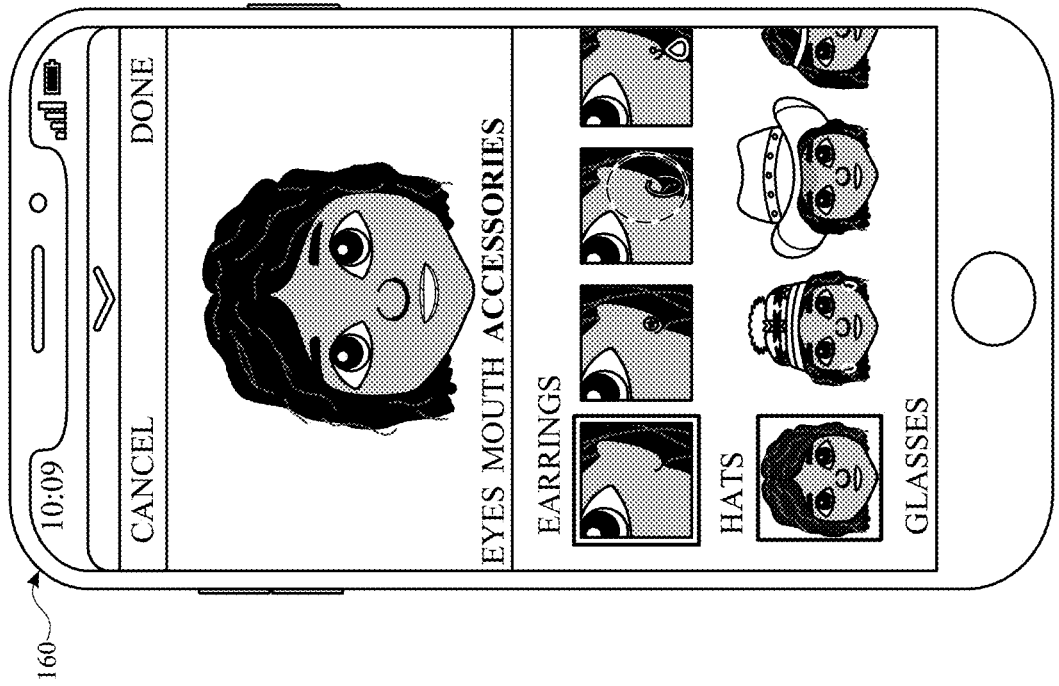
Figure 1E:
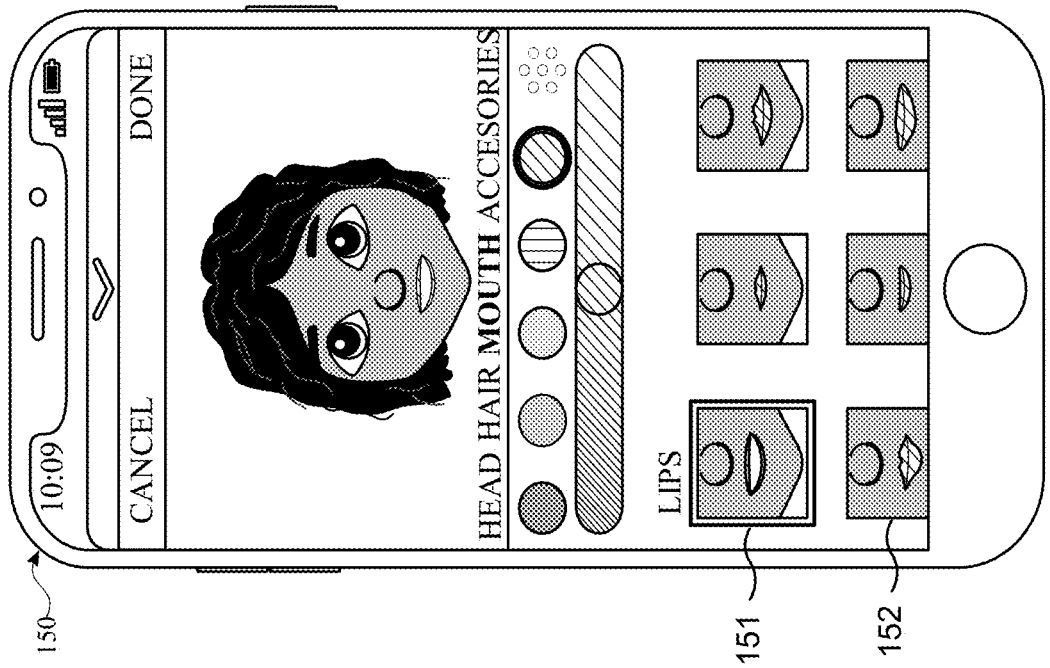

FIG. 1E illustrates a user interface 150 including a mouth that be can be customized on the avatar. As shown in FIG. FIG. 1E, the "lips smiling mouth shape 151 and the "lips closing mouth shape" 152 can be an asset for the feature "mouth." Several different mouth shapes and sizes can be provided to a user for customizing an avatar.

FIG. 1F illustrates a user interface 160 including accessories, such as earrings, hats, and glasses lips that be can be customized on the avatar. Accessories can include jewelry, such as earrings and other piercings, hats, and eyewear. Accessories can include other items that can be added to a head of a user.

Figures 1G, 1H:

FIG. 1G illustrates a user interface 170 including a side view of the head of the avatar. FIG. 1H illustrates a user interface 180 including a close-up side view of an earring location of the head of the avatar. As shown in FIGS. 1G and 1H, different camera views for the features can be provided. Therefore, in addition to providing the user with various features that can be customized, each of the features can also be provided in different camera views.

As shown in FIGS. 1A-1H various features can be customized and various features can be animated. For example, a mouth can be animated to laugh, smile, frown, etc. An eye can be animated to blink, wink, open and close, etc. Further, the mouth animations can be applied to various sizes and shapes of mouths and the eye animations can be applied to various eye shapes, sizes, and colors. All of the customizations options that are available to a user of the avatar application are preconfigured and designed. The customization options can be configured and designed by, for example, the user of the avatar application or by an application developer.

A user may want to manipulate features of the avatar using a camera sensor. As the user's physical features and position changes, a mobile device can detect the changes and modify the displayed image of the avatar to reflect the changes to the user's physical features and/or position. A mobile device can detect a change in a face is a field of view of one or more cameras of the mobile device. The mobile device can change an appearance of an avatar based on a detected change in the face. Blend shapes can be configured for features of the avatar in order to customize the movement and animation of the avatar. Blend shapes can make the appearance of facial movements appear smoothly. Changing the appearance of the avatar based on the detected change in the face provides the user with options for controlling modifications to a virtual avatar without requiring the display of user interface control elements.

II. Blend Shapes

In order to animate features on the avatar, a rig of the head is created. A rig is a skeleton of the head which enables the head to move. In an example embodiment, a single universal rig representing the head can be used. The universal rig can also be known as a universal physics rig. A mesh can be placed on the head so that the surface or the skin of the head can be modified. A mesh can include a certain number of points that are used for sculpting the avatar. The mesh values can also be known as the geometry for assets and features of the avatar. Therefore, all of the customization options (e.g., features and corresponding assets) only need to be generated for a single rig representing the head. The same rig is used and different blend shapes can be triggered.

Figure 2B:
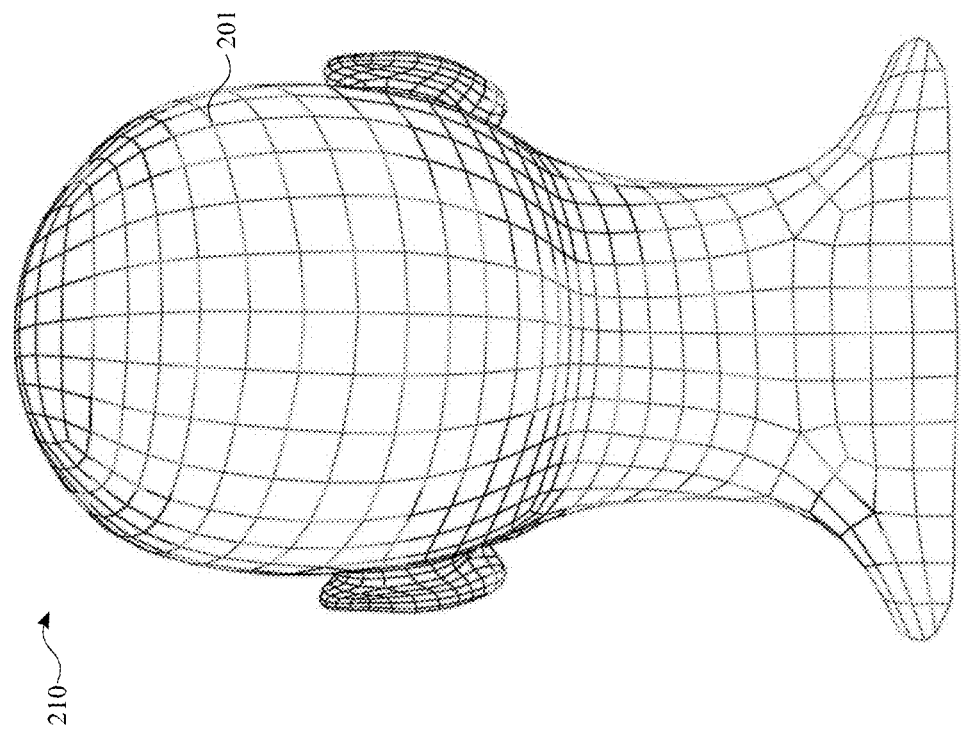
FIGS. 2A, 2B, 2C and 2D illustrate a mesh on a 3D avatar of a head, in accordance with some example embodiments.
Figure 2A:
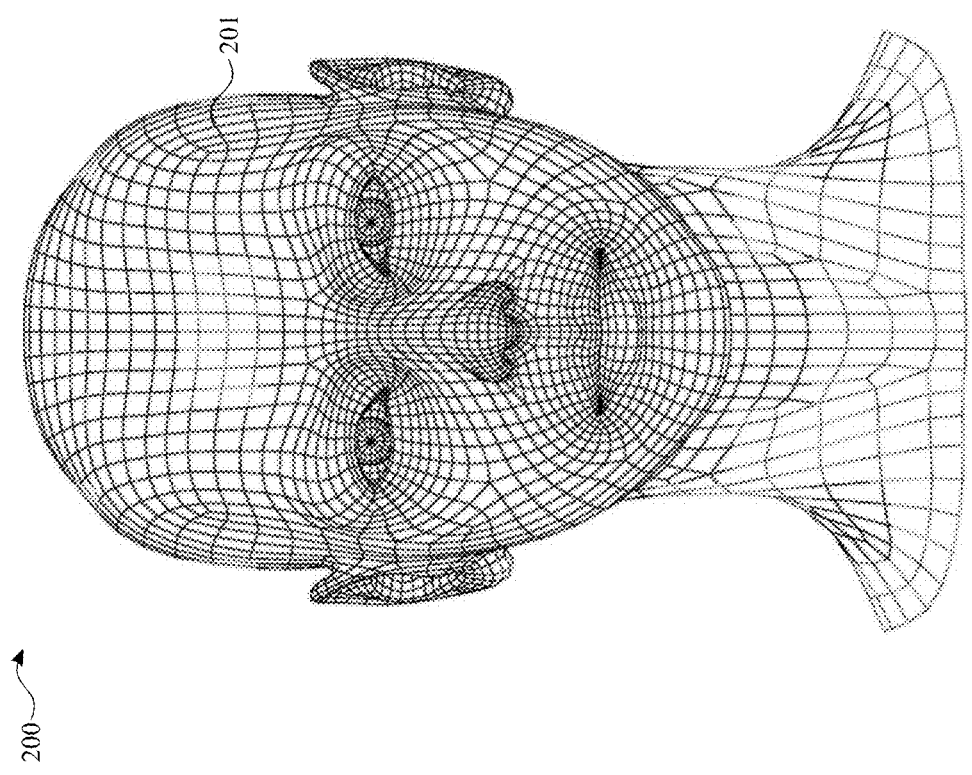

FIGS. 2A and 2B illustrate a mesh on a 3D avatar of a head, in accordance with some example embodiments. FIG. 2A illustrates a front view 200 of a mesh 201 on a 3D avatar of a head and FIG. 2B illustrates a back view 210 of the mesh 201 on a 3D avatar of a head The mesh can include an array of vertices. In order to create an animation, the mesh is morphed in order to produce the appearance of an animation, and the morphing of the mesh results in blend shapes. Morphing of the mesh can also be called changing, modifying or animating the mesh.

Figure 2D:
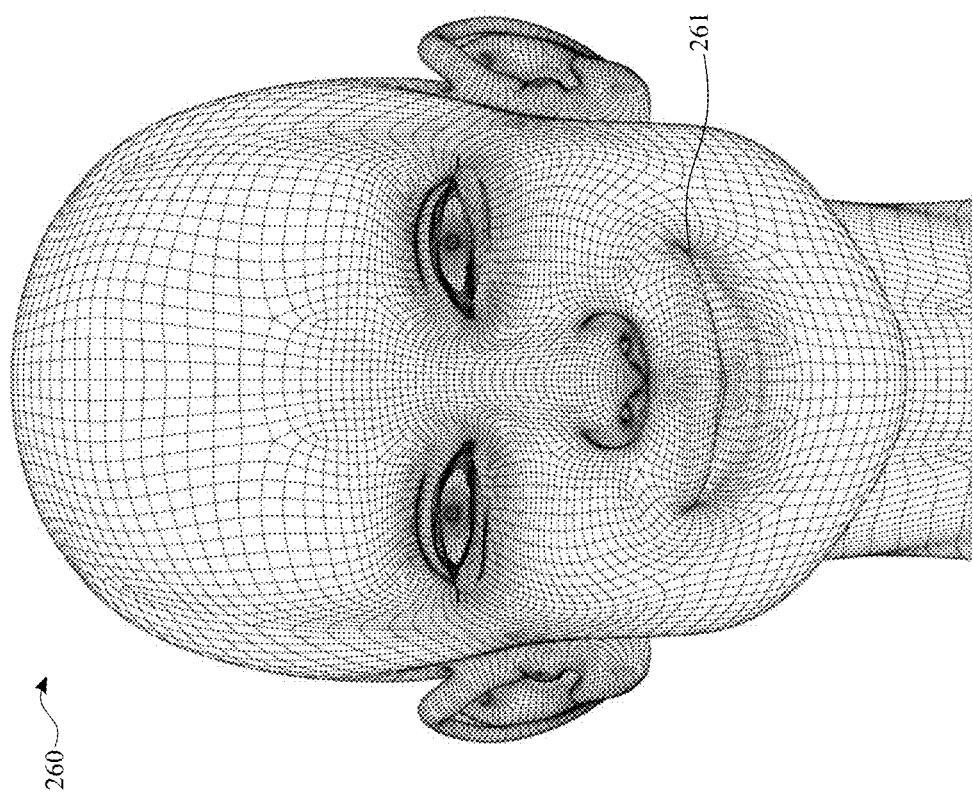
Figure 2C:
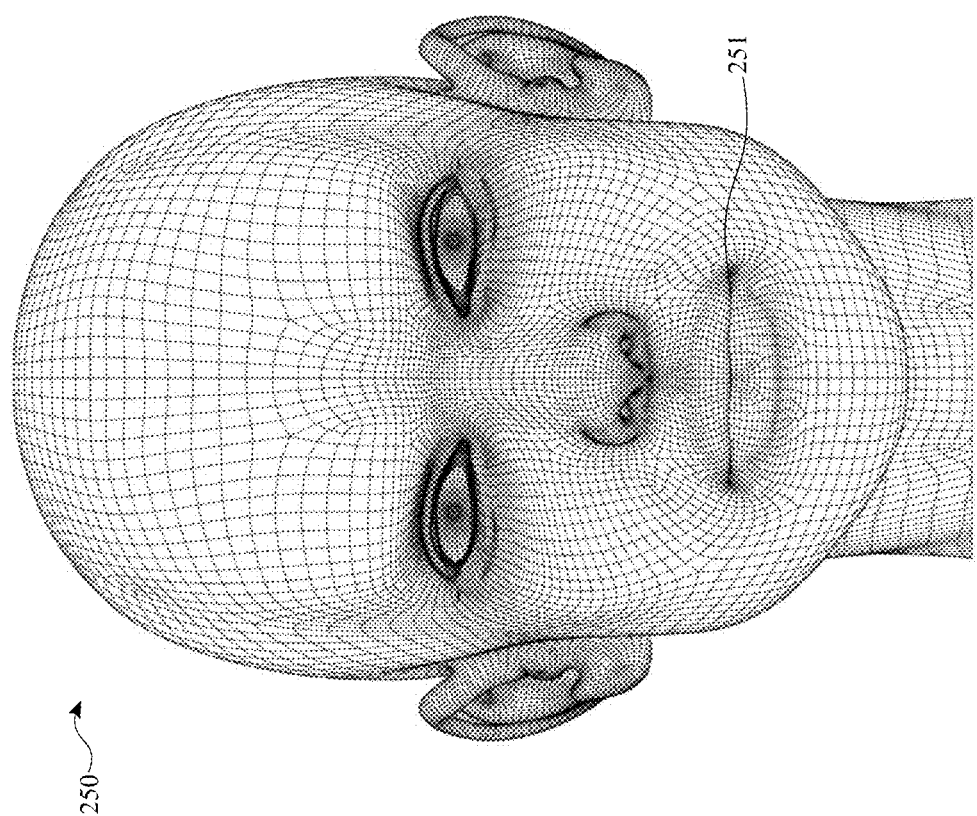

FIGS. 2C and 2D illustrate a mesh that is morphed or changed. As shown in FIG. 2C the mesh is in a default state. The mesh in the area around the mouth is at a position 251. The default state can be a neutral state of the face. As shown in FIG. 2D, the mesh is morphed to indicate a smile. As shown in FIG. 2D, the mesh is morphed in the area 261 around the mouth of the avatar. A blend shape is used to indicate the change in the position of the mesh around the mouth. For example, FIG. 2D can be a blend shape that includes an offset from the original model shown in FIG. 2C.

A face can have, for example, 51 facial muscles. Each of the muscles can correspond to a blend shape or animation variable. For example, a smile or a blink can correspond to a facial muscle. The blend shapes that correspond to the muscles can be known as expression shapes. Each animation variable can be associated with a single blend shape, however, some animation variables can be associated a plurality of blend shapes, or multiple animation variables can correspond to a single blend shape. The number of blend shapes can vary depending on the facial variable or animation variable. Multiple animation variables could be changed to get to a particular blend shape from the default position of an asset.

For example, for a blink animation, the blink animation can use a blend shape for the eyes being open, another blend shape for the eyes being closed, and one or more blend shapes for the eyes partially closed (e.g., an in-between point). There will be fewer shapes (blend shape and default shape) than there are positions of the asset that are desired for displaying. For instance, the default position may correspond to the eyes being 50% open and the blend shapes correspond to the eyes being 0% open (fully closed) and 100% open (fully open), but it is still desirable to display an avatar with the eyes open 30%.

To enable rendering of these other positions, a linear combination can be taken of the three shapes (default shape and two blend shapes). A simulation (animation) engine can receive input that the eyes are to be opened at 30% (e.g., from an animation file or input from motion capture of a user), and then determine what weights should be applied to each of the shapes to provide a good approximation of what the eyes should look like at 30% open. At a value of 30%, it is possible that the weight from the fully-open blend shape is 0 (e.g., since it is in the other direction from the default state of 50%), but change in shape can be over many mesh values. Thus, including a portion of the fully-open blend shape can provide a better approximation to the 30% open state. In some embodiments, a weight for a particular shape can be between 0 and 1, and a normalization process can be imposed such that the final weights add to 1.

Each position in a blinking animation can be approximated with a different linear combination of the three shapes. Interpolation can be performed to obtain the shapes in between each of the blend shapes. Being "in between" can involve more than one dimension (e.g., input of eyes being opened between 0-100%), and thus the input about the avatar position can be a multidimensional point with each dimension being between 0 and 1 (or other range). The simulation engine can then determine weights for any number of blend shapes to render the avatar image corresponding to the multidimensional input position. Accordingly, the final expression at each instant in time can be a blend of the blend shapes.

As another example, in order to create an animation of a mouth smiling, the array of vertices for the mesh around the mouth can be moved from their original position at a neutral state, to a second position in which the corners of the mouth are partially raised and to a third position in which the corners of the mouth are fully raised. The change from the original neutral position of the mesh to the second position in which the corners are partially raised can correspond to one blend shape. The change from the second position in which the corners are partially raised to the third position in which the corners of the mouth are fully raised can correspond to another blend shape.

It would require a lot of memory to store all of the blend shapes for all of the options of assets for each feature. However, certain blend shapes of different assets of a same feature may be shared. For example, a narrow eye and a wide eye may share some blend shapes. As another example, blend shapes for mouth shapes and lips maybe shared. There can be an overlapping shape to the mouth expression shapes. As a lip shape changes (e.g, as the user moves their mouth), the change to the shape of the lip could result in a change to the shape of the mouth (e.g., outer shape of mouth). For example, the size of the lips on the mouth shape may be wider.

FIGS. 11A-11D illustrate overlapping blend shapes, in accordance with some example embodiments. As shown in FIG. 11A, there can be a default mouth shape 1110 for an avatar. The default shape can also be known as a default base shape. The user may desire the mouth shape to be a smiling mouth shape 1120, as shown in FIG. 11B. The smiling mouth shape can be known as an expression shape since it relays an expression. A smile can include a left smile or a right smile expression shape. As shown in FIG. 11C, a variant 1130 can be added to the smile mouth shape 1120. The variant is a change to the default base shape. The lip variant can change the outer shape of the mouth and would be an overlapping shape to the mouth expression shape. In FIG. 11C, the variant 1130 can be a variant to make the mouth wider. The additive result 1140 of combining the smiling mouth shape with the variant is shown FIG. 11D.

Therefore, in accordance with some example embodiments, blend shapes can overlap instead of creating separate blend shapes for each asset. There can be two smile shapes, such as a left smile shape and a right smile shape, and six lip shapes that can overlap on the left and right smile shape. Instead of having twelve (12) separate blend shapes, the six lip shapes can be an additive to the two smile shapes. The determination as to whether or not to reuse a blend shape can be based on the visual appearance or intended shape of the asset or feature. For example, if a previously established blend shape does not affect the visual appearance or intended shape of an asset or feature, then the blend shape can be reused.

Further, in accordance with some example embodiments, instead of storing separate blend shapes for each asset of each feature, certain blend shapes can be identified for reuse, thereby reducing the amount of memory required. Further, if a user selects a new asset of the same features, one or more of the existing blend shapes in working memory can remain there as they will be reused for animating the new asset.

Figure 8:
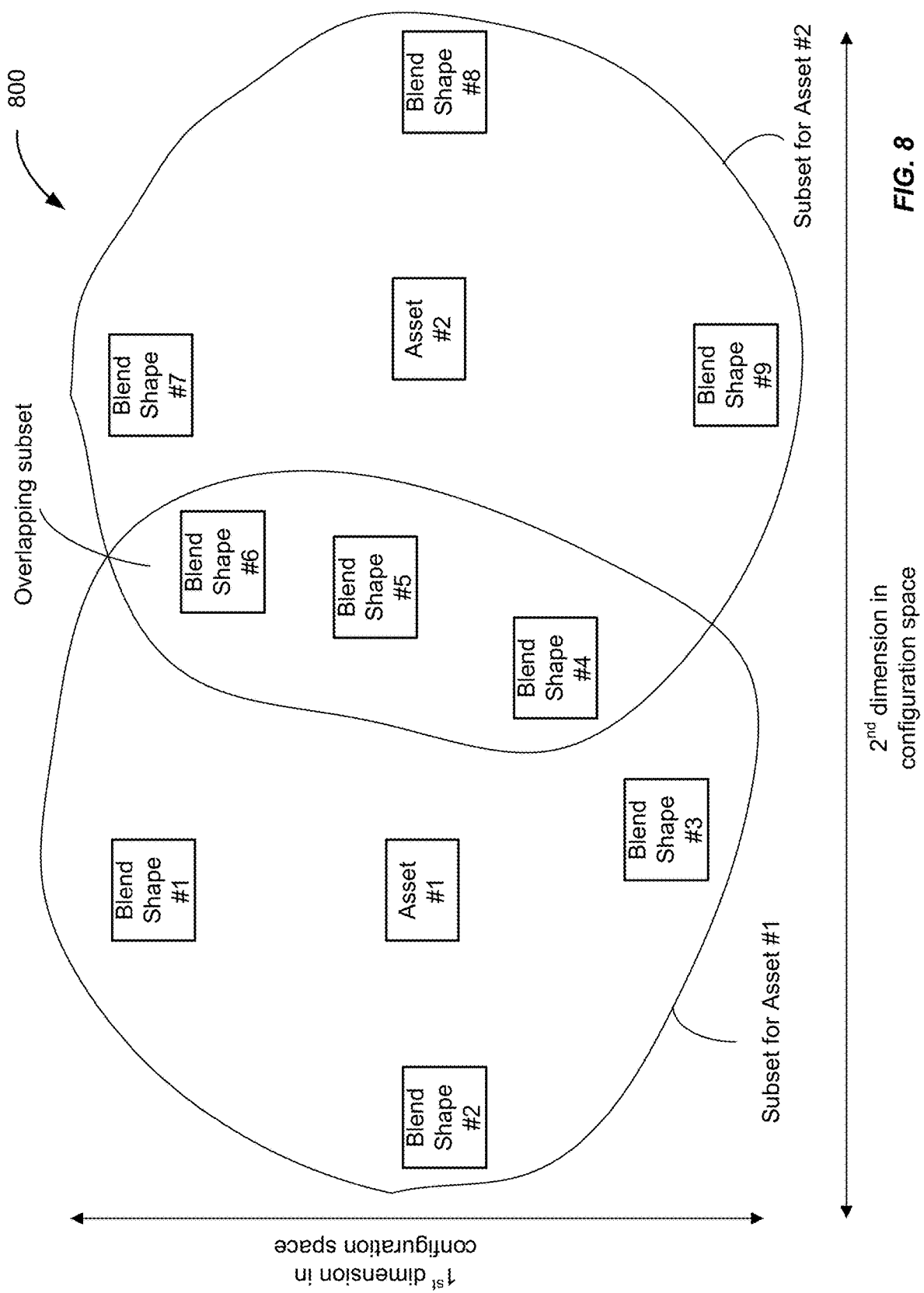
FIG. 8 illustrates a simplified diagram of assets and overlapping blend shapes, in accordance with some example embodiments.

FIG. 8 illustrates a simplified diagram 800 of assets and overlapping blend shapes, in accordance with some example embodiments. FIG. 8 shows blend shapes for a first asset and blend shapes for a second asset in relation to a three-dimensional space. In this example, there are 9 possible blend shapes for the two assets of a feature. The blend shapes occur at different locations for two dimensions in configuration (position) space. For example, a first dimension can correspond to how much a mouth is open vertically, and the second dimension can correspond to how much a mouth is open horizontally.

As shown in FIG. 8, asset #1 includes a subset of the possible blend shapes that includes blend shapes 1-6. Asset #2 includes a subset of the possible blend shapes that includes blend shapes 4-9. The blend shapes corresponding to a particular asset can be identified by the developer, and encoded into a simulation engine. Thus, if asset #1 is selected, an image of the avatar having asset #1 (e.g., a particular mouth) at any instant in time (e.g., based on position from file or from motion capture) can be rendered using the blend shapes 1-6 and the default shape for asset #1. And, if asset #2 is selected (e.g., a different mouth), an image of the avatar having asset #2 at any instant in time can be rendered using the blend shapes 4-9 and the default shape for asset #2.

In the example shown in FIG. 8, blend shapes 4, 5 and 6 are common to asset #1 and asset #2. Therefore, instead of duplicating blend shapes, blend shapes can be shared between assets. In this example, the storage requirements would be reduced by 25%. The specific blend shapes that are shared can be selected judiciously to balance memory and visual appearance of the animation. And, the number of blend shapes that may be shared between two assets will depend on how similar the default appearance of two assets are to each other.

In some embodiments, the change to the expression on the avatar can be based on facial inputs received from the user of the avatar application. As the user's physical features and position changes, a mobile device can detect the changes and modify the displayed image of the avatar to reflect the changes to the user's physical features and/or position. The change to the expression can also be entered by the user and may not be based on the user's physical features and position. For example, if asset #1 corresponds to a "mouth open" and asset #2 corresponds to a "mouth closed," blend shapes 1, 2 and 3 may be unique to asset #1, blend shapes 7, 8 and 9 may unique to asset #2, and blend shapes 4, 5, and 6 are common to asset #1 and asset #2.

Further, when the model is sculpted, only the array vertices that have moved and their offsets need to be stored for a blend shape. An offset is a change in the value of the points in the vertices from the original values of the points on the mesh to a new position for a blend shape. The changes to the mesh can be stored as a series of vertex positions. The vertices can be interpolated for a series of vertex positions. For example, vertices for the creating a smile movement can be interpolated. Only the changes to the vertices in the original model are saved and the entire model does not need to be saved each time.

A. Variants, in-Betweens, and Corrective Shapes

Blend shapes of the example embodiments can be compatible with variants, in-betweens and corrective shapes. Variants, in-betweens and corrective shapes are all forms of shape data. Certain features for an avatar may be a blend shape that includes a variant. A variant can be a shape that can change a default base shape and is not an expression shape. Examples of variants can include eye upturned, eye downturned, etc. As another example, for a small nose, there may be a blend shape called variant small nose. A set of blend shapes can be stored that represent the different variants for each feature. A set of variants can be stored for different nose, ear, and eye sizes.

Corrective shapes are also a form of blend shapes. There may be some assets where the user desires to make adjustments to a blend shape. For example, if two assets do not appear together correctly, a corrective shape can be applied to the original blend shapes. A corrective shape is a form of a blend shape that is an additional offset to an original blend shape. A corrective shape is a shape that may not work alone and may be activated on top of other shapes to fix or tune a combination of shapes that would otherwise clash. When the original blend shape is adjusted, a corrective shape is created. The corrective shape is an offset to the original blend shape. The corrective shape is an additional offset to the original mesh. For example, a corrective shape can be applied to a final combination of shapes such as a jaw and mouth, or an eye blink and an eye squint.

For example, an avatar may be sculpted to smile and may also be sculpted to have a jaw open. That is, two muscles are being sculpted at the same time. However, when both of them are applied to the avatar, they may not appear correctly. The blended values of a corrective shape can depend on the combination of the shapes that are being corrected. A corrective value can be equal to a minimum value of the shapes that are being corrected. For example, if JawOpen is 0.6 and MouthSmile is 0.9 then the associated corrective value will be 0.6, which is the minimum value of the shapes that are being corrected.

Figures 12A, 12B, 12C, 12D, 12E:
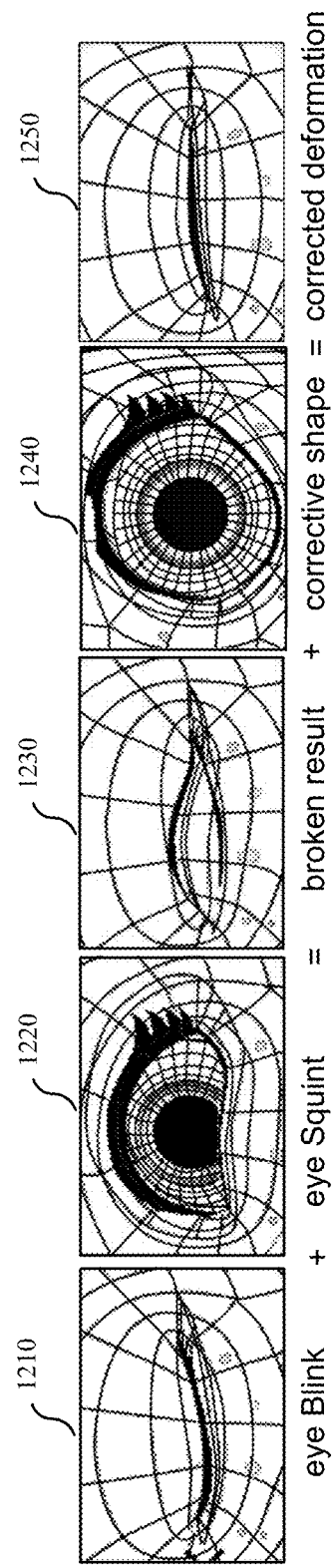
FIGS. 12A-12E illustrate corrective values, in accordance with some example embodiments.

FIGS. 12A-12E illustrate corrective values, in accordance with some example embodiments. There may be a blend shape for an eye blink 1210, as shown in FIG. 12A, and a blend shape 1220 for an eye squint, as shown in FIG. 12B. Each eye can have its own blend shapes. Therefore, an avatar with two eyes can have a blend shape for each eye. The combination of the eye blink and the eye squint blend shapes may create a broken result 1230, as shown in FIG. 12C. As shown in FIG. 12C, the combination of the eye blink and the eye squint results in an area 1231 where the blend shapes appear deformed. Therefore, the eye blink and the eye squint cannot be combined without modification.

As shown in FIG. 12D, a corrective shape 1230 can be used to fix the broken result 1230. As shown in FIG. 12E, when the corrective shape 1240 is added to the broken result 1230, a corrected deformation 1250 can be generated, which is a result of applying the corrective shape 1240 to the broken result 1230. The user may determine a corrective shape that can be applied to the broken result. A plurality of different predetermined corrective shape options may be available to the user.

A corrective shape may be applied to the blend shape of the smile and/or the jaw. The corrective shape can be applied to a model by adjusting a control dial on the user interface to a value between 0-1. The value 1 can be the full corrective shape and the value 0 can the least full version of a corrective shape. For example, a value of 1 can be a correction to mouth so that a mouth appears fully open and a value of 0 can be a correction to the mouth so that the mouth appears closed.

If a modification is made to a first asset, e.g., the smile, it can be determined that there is a second asset, e.g., the jaw opening, that corresponds with the smile. Since these features correspond with each other, a corrective shape can be calculated for the second asset (e.g., jaw opening). The corrective shape is an offset of the blend shape of the second asset (e.g., jaw opening). The second asset (e.g., jaw opening) can be updated in accordance with the corrective shape and the updated second asset can be displayed.

There are also blend shapes called in-between blend shapes, which are blend shapes that are in-between blend shapes. An in-between shape can be an interpolation shape through which the vertex will go through before reaching the end point of the related parent shape. An example of an in-between blend shape can be an eye that is partially open.

B. Consistency in Features and Assets

In accordance with example embodiments, consistency is maintained between features and assets on an avatar since live tracking of changes is performed. If a change is made to one feature or asset, then blend shapes for the other features on the avatar are updated in accordance with the change so that the avatar appears balanced. For example, if the size of the head is increased or decreased (e.g., a variant is applied to a blend shape), then blend shapes for the assets that are affected by the change to the size of the head can automatically be changed. A user does not need to separately adjust each feature and/or asset and rebuild the head.

For example, if a change is made to a head shape, such as a change to a jaw line, then assets that are affected by the change to the head shape, such as hair, will be updated in order to accommodate the change to the head shape. Further, any additional assets that are affected by the initial change to the head shape, can also be updated. As another example, if a change is make to an eye shape, such as having the eye shape upturned or downturned, then the eyelashes on the eye can also be updated according to the new eye shape. The eyelashes can be updated to follow the shape of the new eyelid for the changed eye. It can be visually determined as to which assets are affected by a change and the affected assets can be updated accordingly.

In determining which features and/or assets needs to be adjusted, the mobile device determines which features and/or assets are being applied. For example, if a size of a head is changed, all assets that are available to a user are not updated because of the change to the size in the head. Instead, it is determined which assets are being applied to the avatar, and only those assets that are being applied need to be updated. Therefore, not all of the assets for a feature need to be updated, but only the assets for the feature that are currently used on the avatar need to be updated.

The consistency in updating also applies to an animation. When there is an animation to the face, all assets that are affected by the animation will also be updated without requiring the user to change all of the assets that are affected by the animation.

Therefore, an example embodiment provides a technique for enhancing the user experience.

C. Configuration File—Blend Shapes

Figure 3:
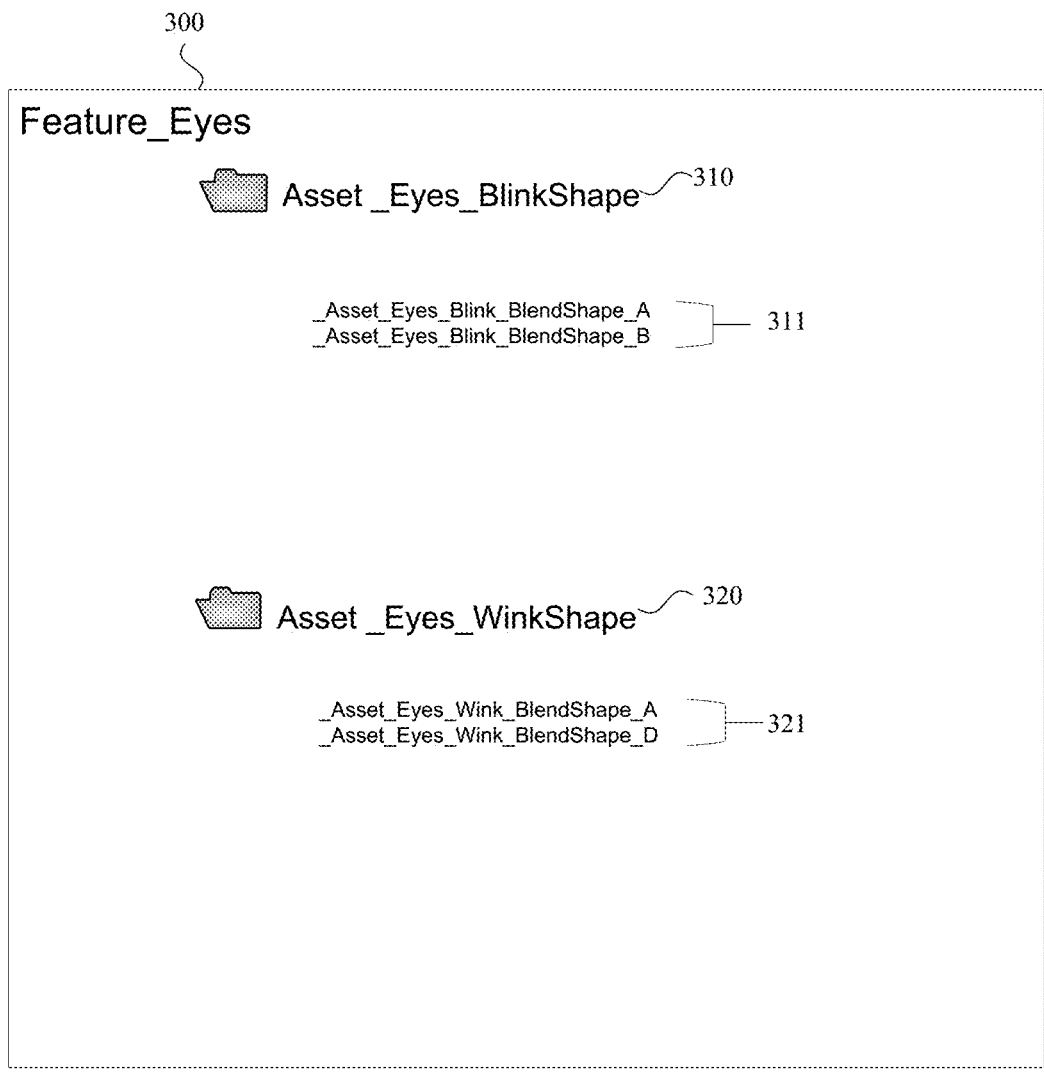
FIG. 3 illustrates a configuration file for assets, in accordance with some example embodiments.

FIG. 3 illustrates a configuration file 300 for assets, in accordance with some example embodiments. The configuration file 300 can be stored in a memory of the mobile device. A configuration file can indicate how features, assets and blend shapes are connected with each other in order to minimize the amount of memory consumed. A configuration file can be an XML file.

A mobile device can have limited memory and/or processing capacity. Therefore, it would consume a large amount of memory if all options are stored in the memory of the mobile device. In accordance with an example embodiment, a compressed file can be stored for each of assets. The compressed file can store the 3D geometry for the asset and the compressed blend shapes. The files are compressed since the data is stored at a low resolution.

In storing the blend shapes, the deltas representing the changes to the initial blend shape are stored, instead of storing all of the parameters of the updated blend shape. Only the vertices that have moved from the default model (delta values), are stored. The delta values, which represent the changes from the original blend shape, can be quantized to a value between 0-1. That is, the deltas can be associated with a discrete value.

As shown in FIG. 3, the file for the feature "eyes," includes a plurality of configuration files for different assets. The configuration file can include geometry shape information or blend shape information for an asset. An asset, such as mouth left up, would include blend shape information. A configuration file for an asset, such as hairstyle and glasses, can include geometry information.

FIG. 3 shows configuration files for the asset eyes "blink shape" 310 and "eyes wink shape" 320. Another example could be of a wide eye or a small eye. In the example, the eyes in the configuration file are the same and are directed to different expressions. The configuration files for the asset "eyes blink" 310 includes the blend shapes 311 in order to create the asset. The configuration file for the asset "eyes wink" 320 includes the blend shapes 321 in order to create the asset. As shown in FIG. 3, blend shapes can be reused for different assets and they do not need to be recreated for different assets.

Therefore, in accordance with example embodiments, space is optimized and resources are shared across assets. A complete rebuild of the avatar for each asset option is not required. Further, the amount of information that is stored is also made minimal through the use of a unified rig. Providing multiple rigs can be very difficult to store and load. Therefore, the amount of data that is stored and loaded at runtime is minimized through the use of a unified rig.

D. Method Overview—Blend Shapes

Figure 4:
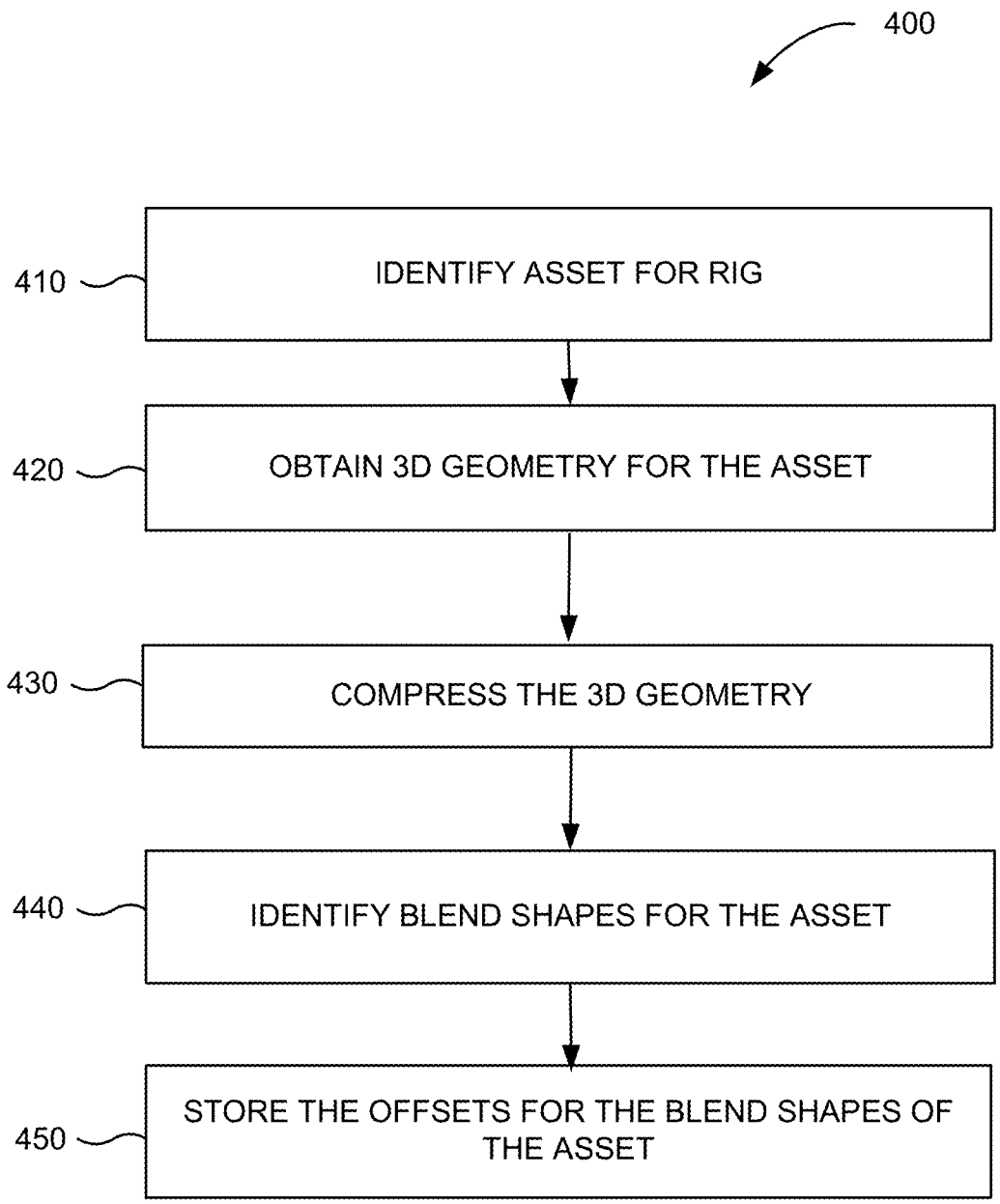
FIG. 4 is an overview of a method for optimizing the storage of asset resources, in accordance with some example embodiments.

In accordance with some example embodiments, the amount of memory used for an avatar can be decreased by optimizing asset resources. FIG. 4 is an overview of a method 400 for optimizing the storage of asset resources, in accordance with some example embodiments.

At step 410, the mobile device identifies a first asset among the first set of the plurality of assets corresponding to a first feature. The mobile device can perform the identification based on user input, e.g., selecting a particular asset. The plurality of assets can be defined for a universal rig of a head. All of the features and assets will be designed in accordance with the single universal rig. When the assets are defined for a single universal rig of the head, this can minimize the amount of data that needs to be stored for each of the customization options. Further, only one rig would need to be loaded to generate the avatar.

At step 420, the mobile device obtains the 3D geometry for the first asset among the first set of the plurality of assets corresponding to the first feature. The 3D geometry can include the mesh information needed to create the asset in a 3D space. The 3D geometry can include x, y, and z coordinate information.

At step 430, the mobile device compresses the 3D geometry for the first asset. The 3D geometry can be compressed by filtering the 3D geometry to a lower resolution. The assets can be in a compressed state so that they will consume less memory space on the mobile device.

At step 440, the mobile device identifies a first set of the plurality of blend shapes corresponding to the first asset that is selected among the first set of the plurality of assets corresponding to the first feature. Blend shapes can be created for all of the features and assets that are available on the avatar application. As an example, an animator can sculpt blend shapes for the motion of a particular asset. A plurality of positions can be selected for sculpting. The number of positions that are sculpted can vary based on an optimization procedure. The optimization procedure can be used to determine how close a position can be approximated by interpolation for different selections of the blend shapes. The optimization procedure can also be used to determine which blend shapes can be shared. Therefore, the optimization procedure can provide sufficient accuracy for the motion of an asset.

At step 450, the mobile device stores the offset values for the first set of the plurality of blend shapes corresponding to the first asset in a memory of the mobile device. An offset is a change in the value of the points in the vertices from the original values of the points on the mesh. The changes to the mesh can be stored as a series of vertex positions. Only the changes to the vertices in the original model are saved and the entire model does not need to be saved each time. A compressed configuration file is then created for each asset.

Figure 5:
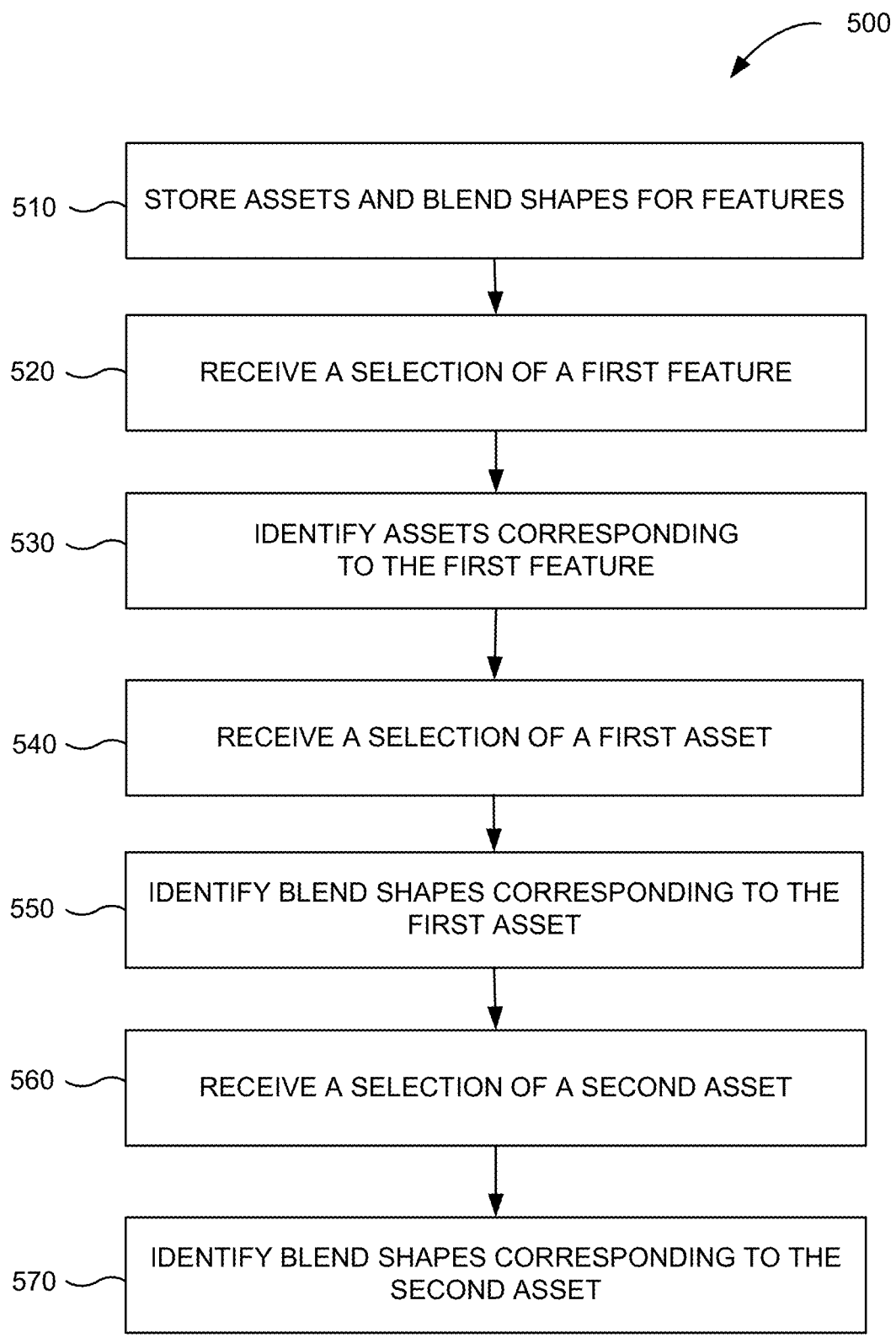
FIG. 5 is an overview of a method for optimizing asset resources, in accordance with some example embodiments.

After configuration files are created for each asset, the assets can be used in creating an avatar. FIG. 5 is an overview of a method 500 for optimizing asset resources, in accordance with some example embodiments.

At step 510, the mobile device obtains the store a plurality of assets and the plurality of blend shapes corresponding with the plurality of assets for a plurality of features of an avatar. The plurality of assets and the plurality of blend shapes were stored as described in FIG. 4. A feature for an avatar can correspond to, for example, an eye, a nose, an ear, a mouth. If the feature is an eye, assets corresponding to the feature (e.g., eye) can include eye size, eye shape, etc. Some assets may only require a single blend shape. For example, an open eye may only require a single blend shape for an open eye. However, a blinking eye may require a plurality of blend shapes in order to achieve the visual of an eye blinding. Therefore, the application can be configured to store a plurality of different assets and blend shapes for the assets.

At step 520, a user can select a feature that the user would like to customize. The user can enter a feature they would like to customize on the user interface of the mobile device. For example, as shown in FIG. 1E, the user can select to customize a feature such as a mouth.

At step 530, a processor on the mobile device can identify assets that correspond to the feature that was selected by the user. For example, the mobile device can identify that 20 different mouth options are available. The identified assets can then be displayed to the user, e.g., as in FIG. 1E.

At step 540, the user can select a first asset that corresponds to the feature. For example, as shown in FIG. 1E, the user can select an asset for the mouth such as lips. As shown in FIG. 1E, the "mouth smiling mouth shape" 151 is an asset for the feature "mouth."

At step 550, the application can identify blend shapes that correspond to the first asset. For example, if the first asset is a mouth smiling, there can be three blend shapes that are identified as corresponding to the first asset of a mouth smiling. This is merely an example, and more than three blend shapes can correspond to an asset. The blend shapes correspond to different movement positions for how the mouth can be animated. For example, one blend shape can be for the mouth being opened, another blend shape for being closed (potentially tightly, depending on how the default 3D geometry is defined). Other blend shapes can correspond to various other movements, e.g., for other types of features, e.g., eyebrows being furled for an asset of eyes.

Once the blend shapes are identified, they can be used for animating the avatar. For example, if the user open her mouth, the animated character of the avatar can open her mouth. An imaging sensors can use passive or active techniques for such imaging. Passive techniques use ambient light, as a typical camera would do. Changes in the camera images can be analyzed to determine changes to the mouth. Active techniques can emit light that is reflected from the face of the user, and then detected by sensors. For example, an array of infrared emitters can emit a beam of light that reflects and is detected by an array of detectors. A time of flight can be measured for the light, thereby providing a depth map of the face. An opening of mouth can be detected by determining the area of the mouth, which does not reflect light is larger than in previous measurements.

The degree that the opening of the mouth has changed can be translated to a numerical value. For example, an opening of 5 mm can translated to be 20% of an open mouth. The precise correspondence between measurements and percentage can vary per user's face, e.g., based on a width of the user's mouth. Thus, for another user, an opening of 3 mm can correspond to the mouth being 20% open. Similar measurements can be made for a width of a mouth, e.g., for a user pursing their lips.

The percentage that a mouth is open (or otherwise changed, e.g., laterally for pursuing) can be used to determine which blend shapes to use to render the avatar to have a position that is similar to the of the user. The final rendered shape of the first asset can be represented as a linear combination of the blend shapes. To determine the linear combination, a weight can be applied to each variable coordinate of a blend shape (e.g., 10 points for the mouth). Such a weight may be zero, but could be some fraction, e.g., 0.2. The default 3D geometry of the asset can also have an assigned weight. A second asset can be animated using a blend shape that is shared with or common with a first asset. The common blend shape can be kept in memory when the user selects a new asset.

At step 560, the user can select additional or alternative features to customize on the avatar. The user can select a second asset that corresponds to the feature. For example, for the feature "mouth" a user can select an asset for the mouth such as lips. The "lip closing mouth shape" 152 that is an asset for the feature "mouth" can be selected.

At step 570, the application can identify blend shapes that correspond to the second asset. For example, if the second asset is a mouth closing, there can be three blend shapes that are identified as corresponding to the second asset of a mouth closing. This is merely an example, and more than three blend shapes can correspond to an asset.

It can be determined that a the first asset and the second asset include a same blend shape. For example, one of the blend shapes for mouth smiling can be the same as a blend shape for a mouth closing. Therefore, in accordance with some example embodiments, blend shapes that are the same for different assets are reused. Similar blend shapes do not need to be recreated and can be shared between assets.

Figure 9:
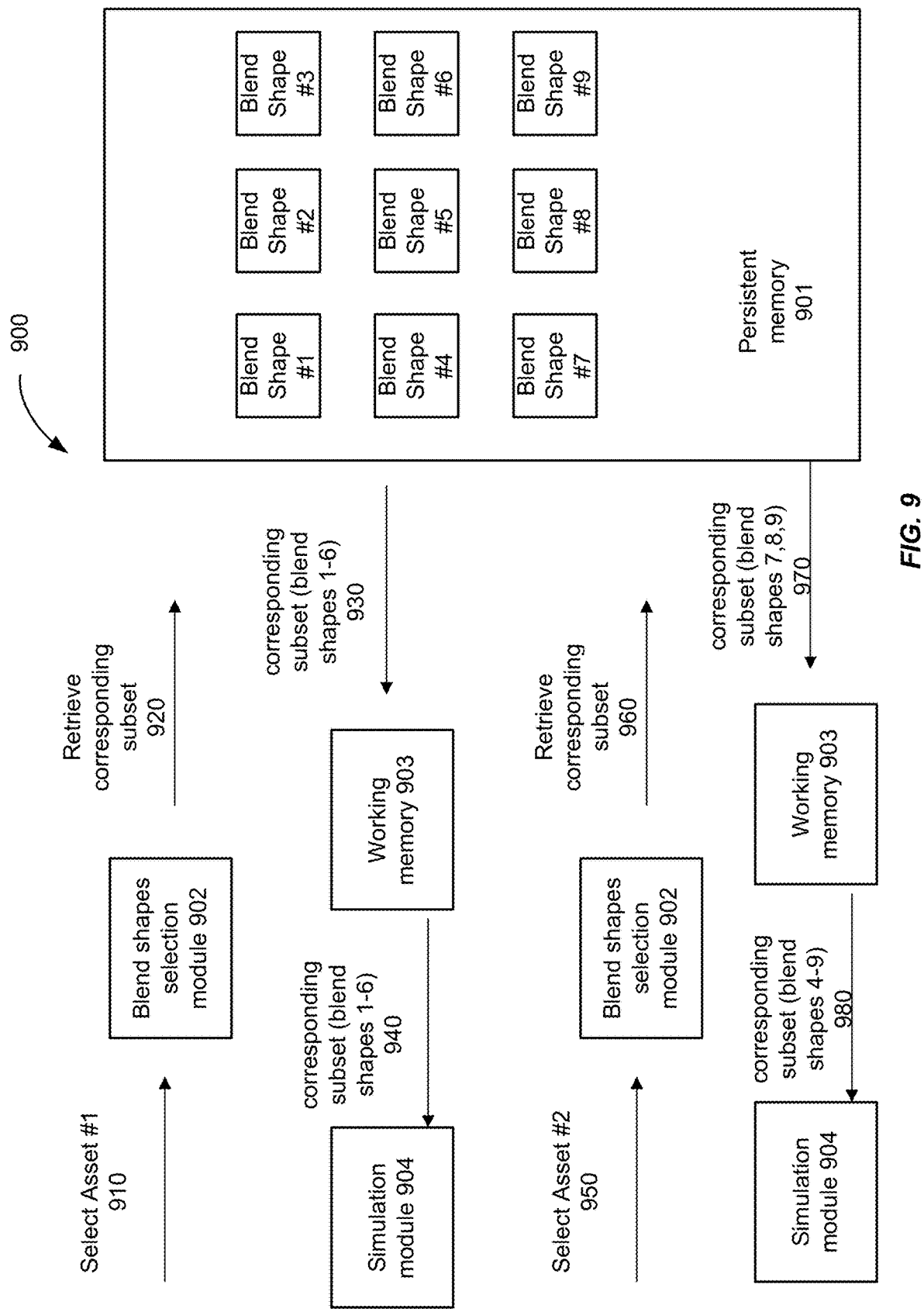
FIG. 9 illustrates an overview of blend shape storage and retrieval, in accordance with some example embodiments.

FIG. 9 illustrates an overview of blend shape storage and retrieval, in accordance with some example embodiments. As shown in FIG. 9, blend shapes for various types of assets can be stored in persistent memory 901. In the example shown in FIG. 9, 9 blend shapes are stored in the persistent memory 901 for two different assets, and corresponds to the example in FIG. 8. However, this is merely an example and blend shapes for a plurality of different assets can be stored in memory.

At step 910 the first asset can be selected by a user via a user interface, e.g., as described herein. A first asset can include blend shapes 1-6. Blend shapes that are associated with the first asset can be selected using blend shapes selection module 902.

At step 920, blend shapes that correspond to the first asset will be retrieved from persistent memory 901. Blend shapes selection module 902 can include a list of identifiers for the blend shapes corresponding to the first asset. The list can be specified by the provider of the animation software and installed as part of a software package.

At step 930, blend shapes 1-6, which have been identified as the subset of assets that correspond with the first asset, are stored in working memory 903. Once the blend shapes are stored in working memory 903, they may be used for animation.

At step 940, the subset of blend shapes that correspond with the first asset (e.g., blend shapes 1-6), can be provided to simulation module 904. Simulation module 904 can simulate the expression of an avatar that that has the first asset on an avatar. For example, simulation module 904 can determine a linear combination of blend shapes 1-6 and the default shape based on an expression position, e.g., as measured from a user's face using a motion capture sensor and circuitry.

At step 950, a second asset may be selected. A second asset can include blend shapes 4-9. Blend shapes that are associated with the second asset can be selected on blend shapes selection module 902.

At step 960, blend shapes that correspond to the second asset will be retrieved from persistent memory 901. Therefore, only blend shapes that are not already in the working memory may be retrieved from persistence memory. It can be determined that blend shapes 4-6 are already in working memory 903, and thus do not need to be retrieved. Thus, step 960 can determine which blend shapes are not already in working memory 903.

At step 970, blend shapes 7, 8, 9, which have been identified as the subset of assets that correspond with the second asset and are not currently stored in working memory 903, are stored in working memory 903. If the blend shapes corresponding to the first asset are no longer needed (e.g., blend shapes 1, 2, and 3), the blend shapes that are no longer needed can be removed from working memory 903.

At step 980, the subset of blend shapes that correspond with the second asset (e.g., blend shapes 4, 5, 6, 7, 8, 9), can be provided to simulation module 904. Simulation module 904 can simulate the expression associated with the second asset on an avatar.

In some instances, it may be difficult to create blend shapes in order to achieve a desired animation. Therefore, instead of morphing the mesh using blend shapes, a new mesh can be used or model swapping can be performed.

III. Model Swapping Using Blend Shapes

Some assets can be based on physics shapes. In an example embodiment, hairstyles can be based on physics shapes. Physics shapes can also be known as model swapping. There may be certain assets where it would be too difficult to modify the original mesh in order to perform blend shaping to achieve a desired asset. Therefore, model swapping or physics shapes can be used. For example, if the user is changing a hairstyle, the original mesh may not have sufficient points to create a different hairstyle. It may be too time-consuming and may consume too many resources to perform blend shaping to change a hairstyle since the mesh that the user is sculpting may not have a sufficient number of points to transform the mesh or geometry into the desired hairstyle. For example, it would be difficult to configure a bob hairstyle using a mesh for a mohawk hairstyle, since a bob hairstyle would require more points on the mesh than a mohawk hairstyle. Whereas if a user were modifying a shape of a chin from a rounded chin to a square chin, it is more likely that the number of points on the mesh for the rounded chin can be used to create a blend shape for a square chin.

Therefore, in accordance with some example embodiments, when the user changes a hairstyle, model swapping can be performed. Instead of morphing the original mesh, the original mesh is swapped with a different mesh in accordance with the desired asset. Blend shapes can also be applied to the new mesh. However, by using model swapping, fewer blend shapes would be required since the new mesh can be more easily configured to create the desired asset.

A. Hairstyles

Model swapping can be used with respect to hairstyles and hair movement. In model swapping, a different model is used instead of sculpting the model using blend shapes. Various hairstyle options and hair texture options can be provided. For example, a user may be provided with 85 different hairstyles to choose from. If the user is changing a hairstyle, the original mesh may not have sufficient points to create a different hairstyle. It may be too time-consuming and may consume too many resources to perform blend shaping to change a hairstyle since mesh that the user is sculpting may not have a sufficient number of points to transform the mesh or geometry into the desired hairstyle.

Therefore, in accordance with some example embodiments, when the user changes a hairstyle model swapping can be performed. Instead of morphing the original mesh, the original mesh is swapped with a different mesh in accordance with the desired asset. Blend shapes can also be applied to the new mesh. However, fewer blend shapes would be required since the new mesh can be more easily configured to create the desired asset.

In order to perform model swapping, a universal physics rig can be used for the head of the avatar. In order to achieve the desired movement, for example, hair movement, it would be difficult if a new physics rig is loaded for each hairstyle. Therefore, a single universal physics rig is used for a plurality of different hairstyle options. One physics simulation engine that is always loaded and running can drive any of the hairstyle options. If a hairstyle is changed while the avatar of the head is moving, the physics of the head responds correctly and consistently. The physics of the head does not need to change when the hairstyles are changed. A plurality of hairstyles can be configured in accordance with the universal physics rig.

Figure 13B:
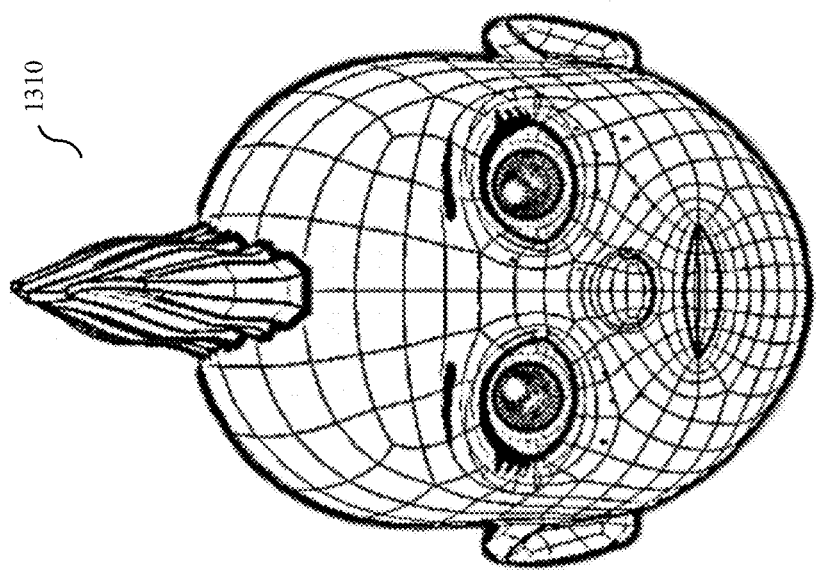
FIGS. 13A and 13B illustrate model swapping, in accordance with some example embodiments.
Figure 13A:
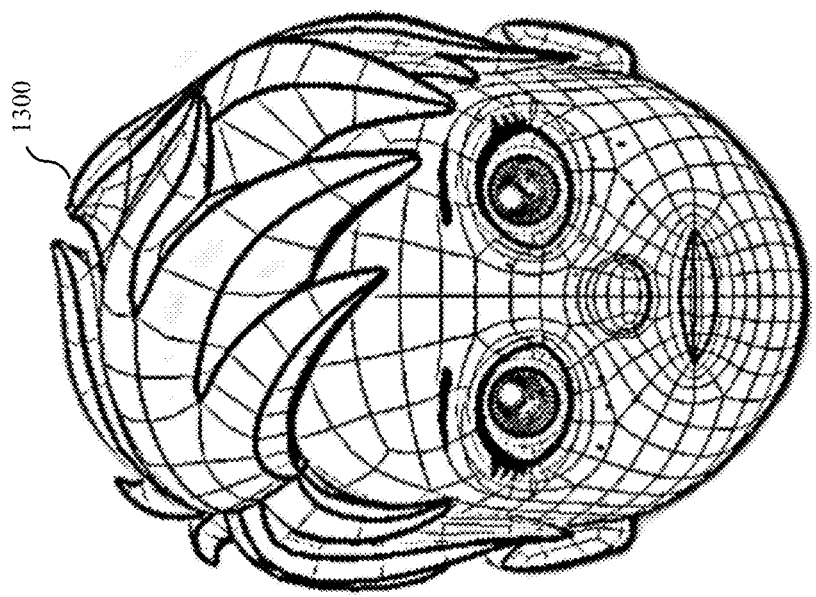

FIGS. 13A and 13B illustrate model swapping, in accordance with some example embodiments. FIG. 13A illustrates a mesh 1300 for a short hairstyle. FIG. 13B illustrates a mesh 1310 for a mohawk. Both hairstyles are configured in accordance with the universal physics rig.

Although a universal physics rig is described, some assets may require a separate physics rig. Therefore, a separate physics rig may be generated for such assets. For example, a skull cap, which sits higher on a head than hair, may have a separate physics rig.

The universal physics rig includes kinematic zones or kinematic chains that act like dynamic particles. The universal physics rig can include a plurality of predetermined zones. Each of the dynamic particles can be associated with zones on the avatar. A zone can also be called a region. In an example embodiment, there are 25 dynamic particles in the head, however, this is an example, and there can be more or fewer dynamic particles in the head. If there are 25 dynamic particles, then there can be 25 zones on the head. The zones can cover all of the locations where the hair might be and each hairstyle can occupy different or overlapping zones. Each of the zones can be simulated with physics. The dynamic regions are configured to work in unison so that the resulting shape will look normal when the hair is activated. The dynamic particles can be predetermined areas of motion.

Figures 14A, 14B, 14C, 14D, 14E:
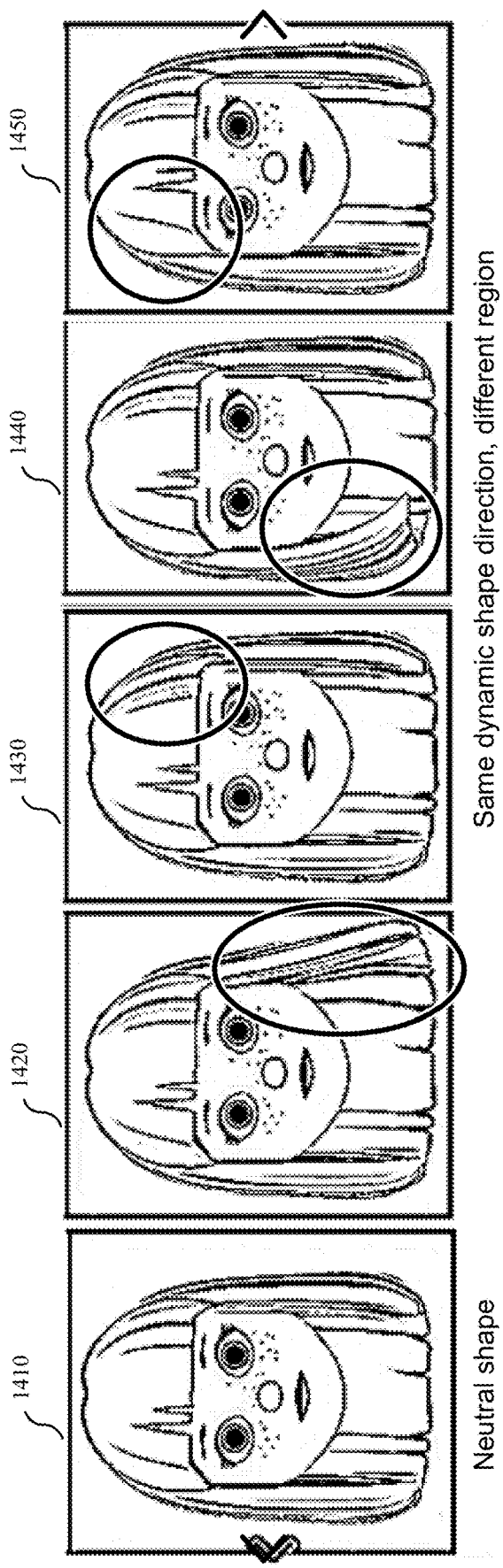
FIGS. 14A-14E illustrate movement of hair within zones, in accordance with some example embodiments.

FIGS. 14A-14E illustrate movement of hair within zones, in accordance with some example embodiments. FIG. 14A illustrates an avatar 1410 with a hairstyle (e.g., long hair with fringe) that is in a neutral shape. FIG. 14B illustrates an avatar 1420 with movement of the hair on the lower right side region of the hairstyle. FIG. 14C illustrates an avatar 1430 with movement of the fringe on the upper right side region. FIG. 14D illustrates an avatar 1440 with movement of the hair on the lower left side region. FIG. 14E illustrates an avatar 1450 with movement of the hair in the upper left side region of the avatar.

The 25 zones on a head can include the back left, back right, back, front left, front right, left, lower back left, lower back right, lower back, lower front left, lower front right, lower front, lower left, lower right, right, tongue, upper back left, upper back right, upper back, upper front left, upper front right, upper front, upper left, upper right and upper. The 25 zones are locations on the head of the avatar. Although 25 zones are used in an example embodiment, an embodiment can be more or less than 25 zones.

Each of the zones can be associated with six degrees of movement. The six degrees of movement can include right, left, up, down, forward and backward. Therefore, each zone (e.g., 25 zones corresponding to 25 dynamic particles on the head) can include six degrees of movement. Blend shapes can be sculpted that correspond with the right, left, up, down, forward and backward movement for each zone.

Although there are 25 dynamic particles on the head, not all of the dynamic particles may be affected when an asset is applied. Each hairstyle can apply to a predetermined number of zones and the hair in the zones can react in accordance with the dynamic particles. For example, if there is a mohawk hairstyle, a mohawk hairstyle may cover two zones, such as an upper back zone and a lower back zone. Therefore, the mohawk hairstyle will react in two different zones. For the two different zones, there is a 3D movement. The hair located in each of the zones can move in a 3D axis (x, y, z). Further, blend shapes for forward, backward, up, down, left, and right movement for the hair for each of the related zones can be determined.

As another example, a bob hairstyle may apply to 6 zones. In the example of the bob hairstyle, blend shapes for an up, down, left, right, forward, and backward movement will be stored for each of the six zones to which the hairstyle applies. Each hairstyle can have a unique geometry and each hairstyle have unique sculpted blend shapes for the zones that the hairstyle includes.

Weights can be applied to each of the zones associated with a hairstyle to indicate the amount of movement for the hair located in the zone. The value of the weight can be based on movement information received from a user. A processor of the mobile device can iterate over the blend shapes of the zones that are used for the selected hairstyle, and determine the blend shapes to be used and their corresponding weights to be applied for the occupied zones of a particular hairstyle.

Therefore, an example embodiment provides an efficient method of simulating movement of hair. An example embodiment would not require a separate physics system for each hairstyle.

Although model swapping is described with respect to assets such as hairstyles, model swapping can be used for other assets such as facial hair, earrings, eyewear, and headwear.

However, these are merely examples. If a number of points on a mesh are insufficient to generate a desired asset, then model swapping may be used instead of generating blend shapes.

B. Configuration File—Physics Shapes

In order to reduce the amount of memory needed to store the assets and their variants for the different hairstyles, an example embodiment provides compressed file storage.

Figure 6:
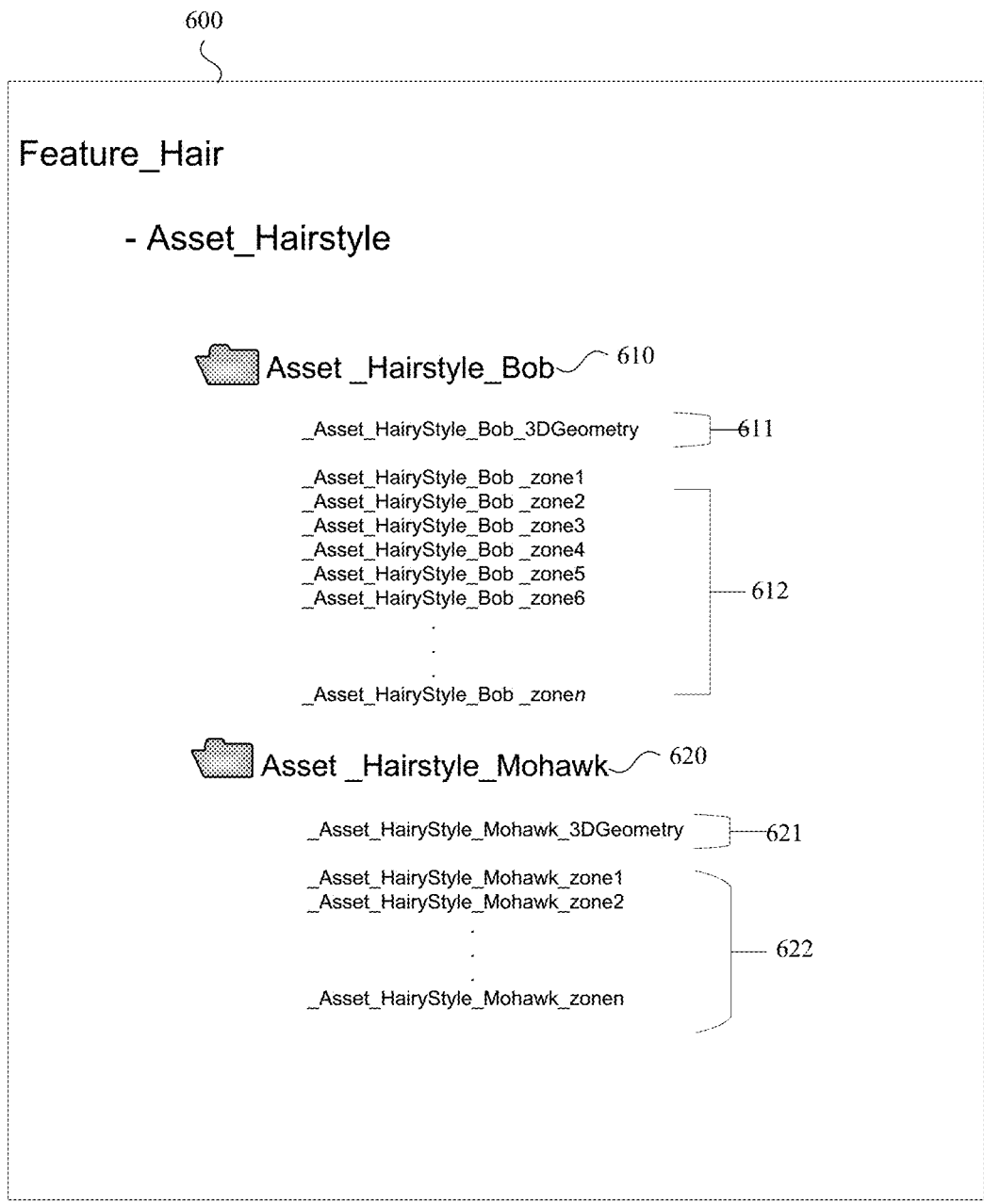
FIG. 6 illustrates a configuration file for hairstyles, in accordance with some example embodiments.

FIG. 6 illustrates a configuration file 600 for hairstyles, in accordance with some example embodiments. As shown in FIG. 6, each hairstyle has a compressed 3D file. The 3D file requires all the information necessary for generating a particular hairstyle. The 3D file includes the geometry and all the blend shapes for each hairstyle.

FIG. 6 illustrates a configuration file 600 for assets, in accordance with some example embodiments. The configuration file 600 can be stored in a memory of the mobile device. A configuration file can indicate how features, assets and blend shapes are connected with each other in order to minimize the amount of memory consumed. As shown in FIG. 6, the file for the asset "hairstyle," for the feature "hair," includes a plurality of configuration files 610 and 620 for different hairstyles. FIG. 6 shows configuration files for the asset "hairstyles_bob" 610 and "hairstyle_mohawk" 620. However, this is merely an example an there can be configuration files for all the hairstyle options that are available. For example, there may be 85 configuration files if there are 85 different hairstyle options available.

The configuration file 610 for the asset "hairstyles_bob" can include the 3D geometry 611 and the zones 612 that are used by the asset "hairstyles_bob." The configuration file 620 for the asset "hairstyles_mohawk" can include the 3D geometry 621 and the zones 622 that are used by the asset "hairstyle_mohawk."

In an example embodiment, a simulation can be performed on individual rigid bodies distributed around the head in locations related to the zones. The resulting dynamic that the individual rigid bodies receive is then transferred to their respective zones. A rigid body drives each zone. The resulting dynamic that is transferred to the zones can include a multiplication factor. The multiplication factor can vary based on the desired dynamic. A custom multiplier value is created for each zone for each of the hairstyles.

For example, a custom multiplier value can be created for each of the 25 zones on a head for each hairstyle. For a given hairstyle, a configuration file can include a list of custom multipliers. The multipliers are a mapping between the zone and how much to trigger the blend shape. Each zone in a hairstyle can be configured with a different multiplier based on the desired amount of movement. That is, each of the zones back left, back right, back, front left, front right, left, lower back left, lower back right, lower back, lower front left, lower front right, lower front, lower left, lower right, right, tongue, upper back left, upper back right, upper back, upper front left, upper front right, upper front, upper left, upper right and upper, can include a custom multiplier value for each hairstyle. The multiplier can include a default value and can be adjusted based on the desired amount of movement. For example, a default multiplier for a zone may be a value of 0.3 and if more movement is desired, the default multiplier for the zone can be modified to 0.35. A simulation factor of 0.35 would result is more movement than a simulation factor of 0.3. The dynamic can be performed by the simulation engine.

The 3D file can include a number of zones for the hairstyle and data regarding the degrees of movement (e.g., up, down, left, right, forward, and backward movement) for each of the zones for the hairstyle. The compressed 3D files can be stored in a memory structure on the mobile device of the user.

Figure 16:
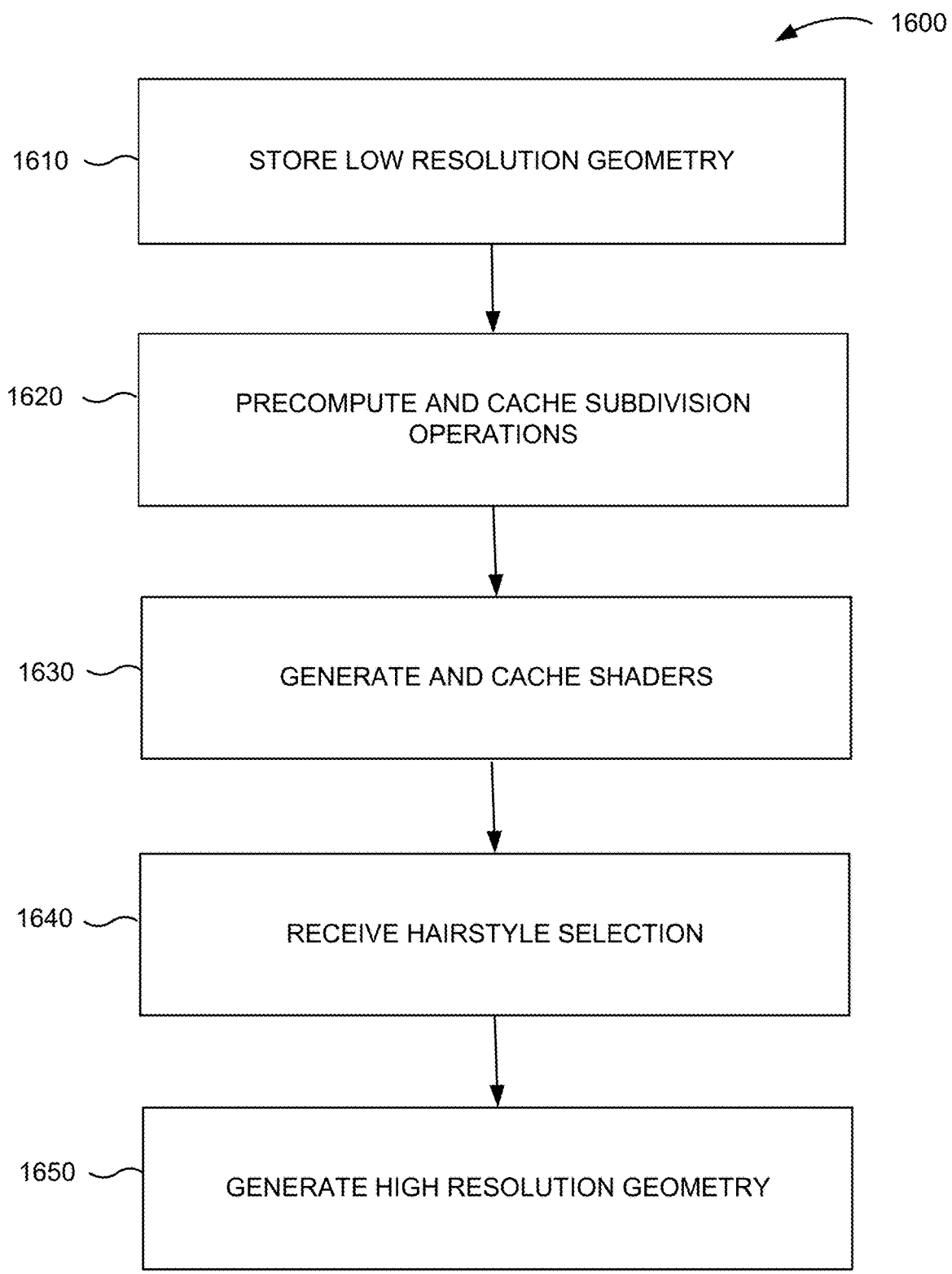
FIG. 16 illustrates a method for efficient caching of geometry, in accordance with some example embodiments.

FIG. 16 illustrates a method 1600 for efficient caching of geometry, in accordance with some example embodiments. An example embodiment provides a method of caching or pre-computing the geometry for hairstyles so that hairstyles can be quickly displayed. At step 1610, the geometry for the hairstyles can be stored in low resolution. The low resolution geometry is stored as a sparse low resolution polynomial. At step 1620, operations for performing the subdivision can be precomputed and cached so that the operations can be loaded quickly.

At step 1630, shaders can be generated and cached. Shaders, which can be code that defines the look of a material, such as skin reacting to light, can also be generated and stored using the subdivision algorithm. Shaders can be written in metal shading language. In accordance with an example embodiment, instead of compiling all of the shaders when a hairstyle is loaded, the shaders can be precompiled so as to speed up the processing time between selection of the hairstyle and when the hairstyle is displayed.

At step 1640, a hairstyle can be selected for display. At step 1650, during runtime, the high resolution geometry is generated. The low resolution geometry is subdivided so as to obtain smooth high resolution geometry. At runtime, the geometry is subdivided so that the hairstyles will be generated using high resolution geometry that is very smooth. The amount of memory consumed by assets can be minimized since a hairstyle does not need to be recomputed and re-subdivided from scratch every time the hairstyle is selected, since some of the geometry, operations, and shaders for a hairstyle has been previously cached.

C. Method Overview—Physics Shapes

Figure 10:
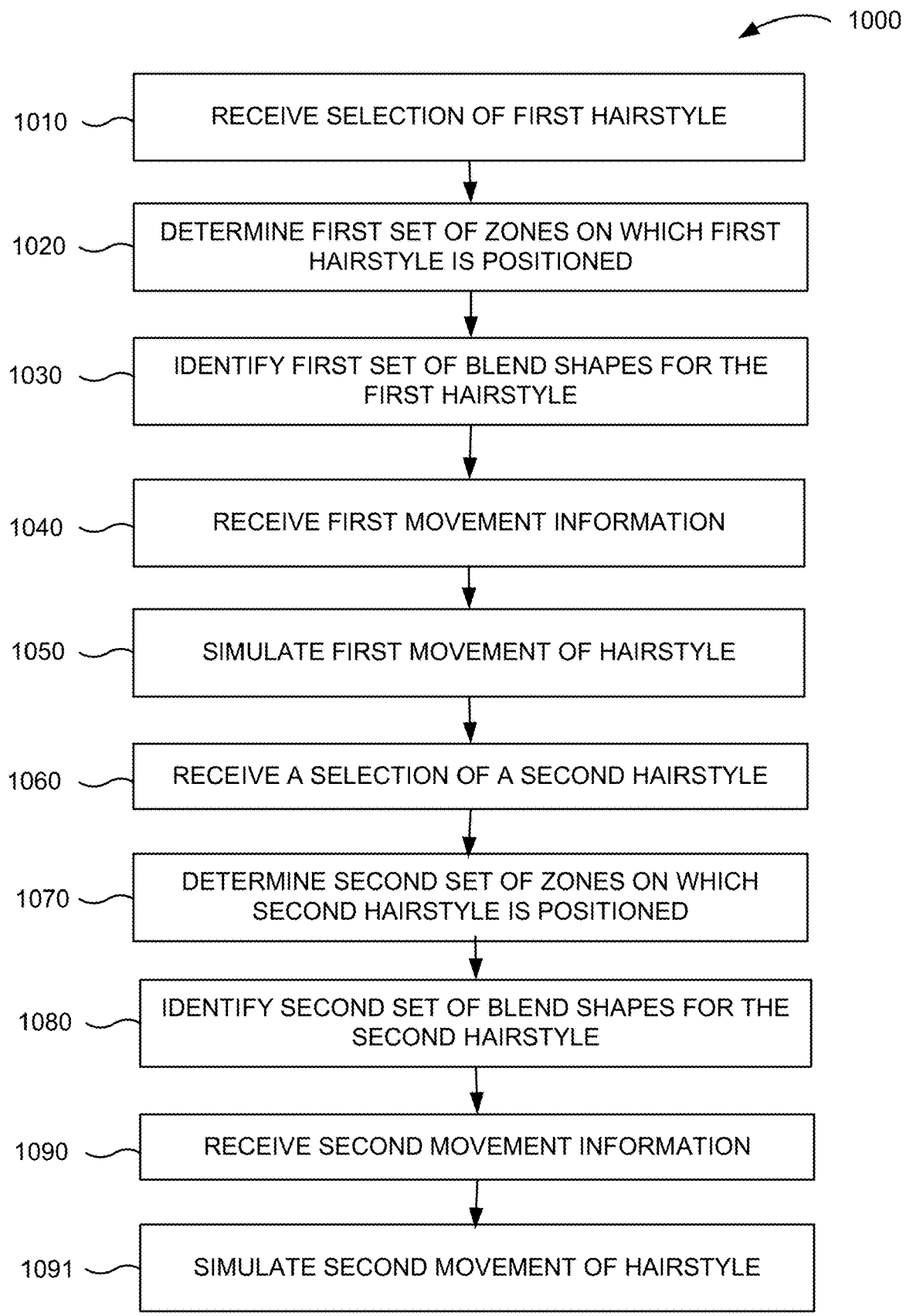
FIG. 10 illustrates a method for simulating hair movement, in accordance with some example embodiments.

FIG. 10 illustrates a method 1000 for simulating hair movement, in accordance with some example embodiments.

At step 1010, a selection of a first hairstyle for an avatar of a head can be received. The selection can be received on a user interface of the mobile device. For example, a user can select a mohawk hairstyle.

At step 1020, the mobile device determines a first set of zones on the avatar of the head on which the first hairstyle is positioned. The first set of zones is selected from a plurality of possible zones for which hairstyles may be defined for the avatar. For example, the first set of zones can be from among 25 possible zones. A mohawk hairstyle can correspond to, for example, two zones.

At step 1030, a first set of blend shapes for each of the first set of zones can be identified for the first hairstyle. The first set of blend shapes correspond to the first set of zones and relate to different directions of movement (e.g., up, down, forward, backward, left and right).

The direction of movement can correspond to a movement such as an up movement, a down movement, a left movement, a right movement, a forward movement, and a backward movement.

At step 1040, first movement information for the head of the avatar is received. The first movement information can be received based on a facial recognition input from a user. Changes in the user's physical features and position changes can be received. Alternatively, a user can input the first movement information manually.

At step 1050, a first movement of the first hairstyle can be simulated using the first movement information. The simulation can use a simulation engine that determines a linear combination of the first set of blend shapes based on the first movement information. The simulation of the first movement information can include, for each of the first set of zones and for each of the first set of blend shapes for the zone, determining a corresponding weight for the blend shape using the first movement information, and applying the corresponding weight to the blend shape as part of determining a linear combination of blend shapes for the zone.

At step 1060, a selection of a second hairstyle for the avatar of the head can be received. The selection can be received from the user interface on the mobile device.

At step 1070, a second set of zones on the avatar of the head on which the second hairstyle is positioned is determined. The second set of zones can be selected from the plurality of possible zones for which hairstyles may be defined for the avatar. For example, the second set of zones can be from among 25 possible zones. The second set of zones can include a first portion that are in the first set of zones and a second portion that are not in the first set of zones. For example, a bob haircut can correspond to, for example, six zones. Two of the six zones of the bob hairstyle can overlap with the zones of the mohawk hairstyle and four of the six zones of the bob hairstyle do not overlap with the zones of the mohawk hairstyle.

At step 1080, a second set of blend shapes for the second hairstyle can be identified. The second set of blend shapes can correspond to the second set of zones and can relate to the different directions of movement.

At step 1090, second movement information for the head of the avatar can be received. The second movement information is different from the first movement information. The second movement information can be received based on a facial recognition input from a user. Changes in the user's physical features and position changes can be received. Alternatively, a user can input the second movement information manually.

At step 1091, the simulation engine can simulate the second movement of the second hairstyle using the second movement information. The simulation can use a simulation engine that determines a linear combination of the second set of blend shapes based on the second movement information. The simulation of the second movement of the second hairstyle can include, for each of the second set of zones and for each of the second set of blend shapes for the zone, determining a corresponding weight for the blend shape using the second movement information, wherein the first weight of the first movement information and the second weight of the second movement information are the same in response to the first movement information and the second movement information being the same. The corresponding weight to the blend shape can be applied as part of determining a linear combination of blend shapes for the zone.

Swapping can be used in other areas of generating an avatar. For example, swapping can be used in the generation of textures for an avatar.

IV. Texture Swapping

In accordance with an example embodiment, the texture on the avatar of the head can be modified by texture swapping. Texture is an image that is applied on the 3D model. The texture ask as decal or a sticker on the 3D model. Textures can be painted on or layered onto the 3D model of the head. Texture can be applied to, for example, skin or hair. For example, the face of an avatar can be modified so as to appear shiny or reflective. As another example, the face of an avatar can be modified to was to appear to have the growth of facial hair (e.g., 5 o'clock shadow). Texture swapping can also be performed with eyebrows, eyelashes, facial hair, etc.

It may be difficult to generate blend shapes for texture. Therefore, in accordance with some example embodiments, changing the texture is performed by texture swapping. Similar to model swapping, certain textures may be difficult to achieve using blend shapes. Therefore, instead of generating blend shapes, a texture on the face can be swapped with a different texture. A texture for a head is composed of layers. Some of the layers can be shared and/or constant. An example of a shared and constant layer is the inner mouth color. Some textures are variant based, such as eyebrows.

A texture can be composited for the combined assets on the avatar. For example, an avatar may have facial hair texture (e.g., 5 o'clock shadow), eyebrow texture, lipstick texture, hairstyle texture (e.g., buzz haircut), etc. In accordance with an example embodiment, instead of compositing the texture for facial hair texture, eyebrows texture, lipstick color texture, and hairstyle texture separately, a single texture can be applied for all of the assets. Therefore, texture can be quickly applied to the avatar.

Figure 15:
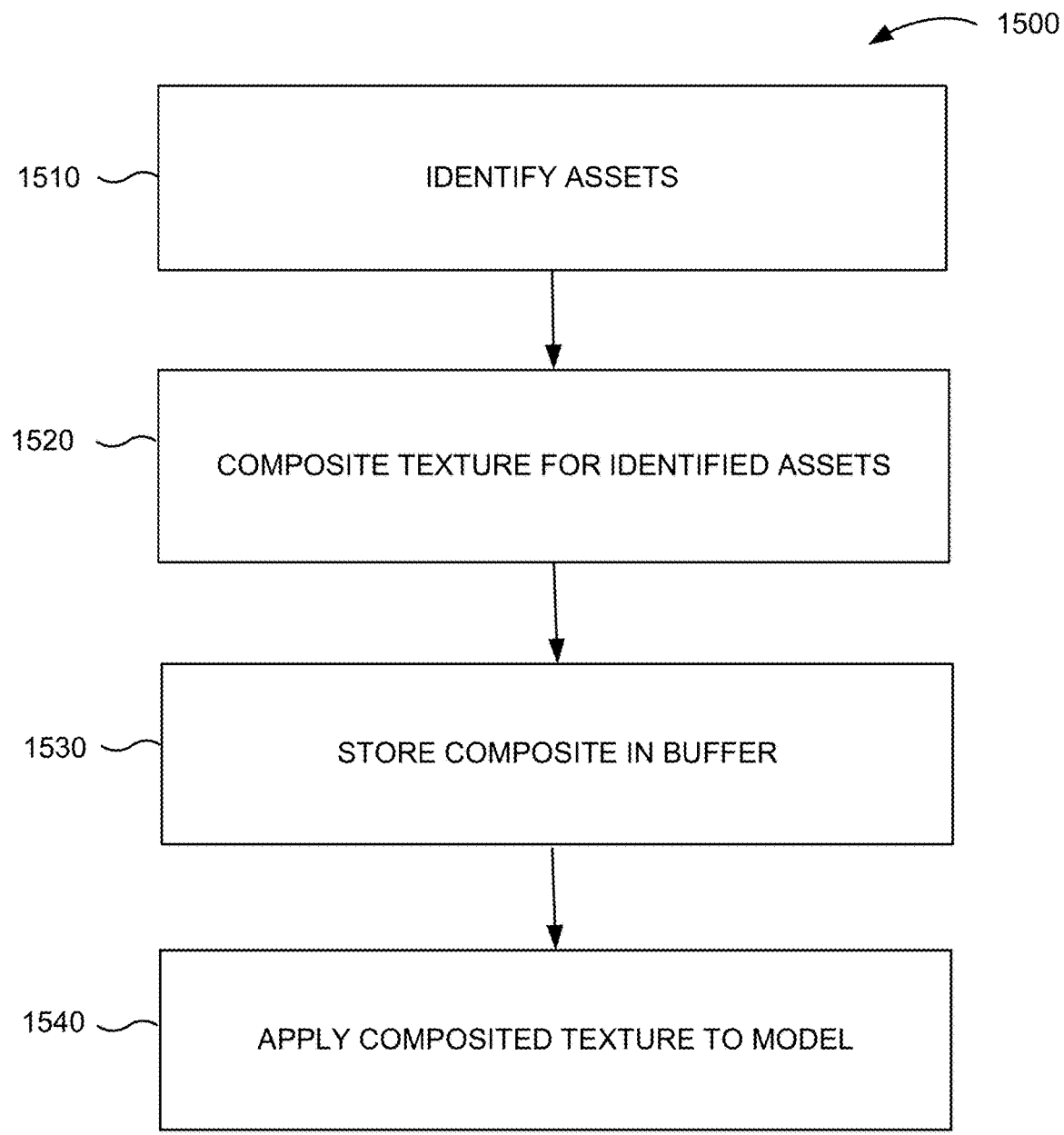
FIG. 15 illustrates a flowchart for a method of generating a composite texture, in accordance with some example embodiments.

FIG. 15 illustrates a flowchart for a method 1500 of generating a composite texture, in accordance with some example embodiments. At step 1510, all of the assets for which texture is to be applied, are identified. Some or all assets on an avatar may be identified by a user for applying texture. At step 1520, the texture for all of the identified assets are composited into a single texture. That is, a single texture composite is created that is to be applied to all of the identified assets. At step 1530, the composited texture is stored in a buffer for temporary storage before the composited texture is applied to the model. At step 1530, the composited texture is applied to the 3D model.

The complexity of the textures can affect the amount of memory that is used. Therefore, the amount of memory that is used for textures can be minimized when a single composite texture is created and stored in a buffer as opposed to creating and storing a plurality of textures for a plurality of different assets of the model independently.

V. Runtime Optimization

In addition to requiring minimal memory storage, an example embodiment for provides for a minimal use of resources of the mobile device during runtime. Various optimization techniques can be employed while the application is running. Optimization techniques can include generating and storing the images at a low resolution, interpolation, an on-screen display cache, and a thumbnail cache.

A. Low Resolution and Interpolation

Assets are stored at a low resolution and are smoothed (e.g., interpolation) at runtime to be higher resolution. Low resolution can be maintained by using a subdivision surface so that the mesh can be stored at a low resolution. Quizzing can also be used, which allows for the sharpening of edges with a very small amount of information.

Each of the assets are stored in small compressed file. Each asset file has one piece of geometry. For example, each hairstyle has its own small compressed file with its piece of geometry. Further, each eye shape and mouth shape can have its own compressed file. During runtime, since a single rig for the head is used, only a file corresponding to the single head needs to be loaded. The asset files that are loaded and unloaded will vary based on the assets that are selected by the user on the user interface. If the user selects a certain feature, assets corresponding to the feature can be loaded into memory. Assets corresponding to features that are not selected by user will not be loaded into memory.

Since the assets are split into different files, it can be easy to combine different assets when creating an avatar. For example, a plurality of different complete avatars having the different assets options do not need to be stored and/or loaded into memory. Therefore, the processing time and the amount of resources used by the mobile device can be decreased. Further, by having small compressed files, files for the assets can be easily loaded and unloaded from memory. Assets that are currently being applied to the avatar can be loaded to memory and when the asset is no longer being applied to the avatar, the asset can be unloaded from memory.

B. On-Screen Display (OSD) Cache

Since there are various feature an asset combinations that can be selected, only those that will appear on the display at a given time can be cached. For example, if there are 100 hairstyle options, all 100 hairstyle options do not need to be cached in response to the user selecting feature "hair." Instead, only those hairstyles that will appear on the display at a given time need to be cached.

In an example embodiment, only the hairstyles of an active instantiated avatar are cached. That is, only the hairstyles of the avatars that are displayed live on the screen, are cached. In another embodiment, during hairstyle selection, all of the hairstyles can be kept in memory so that changes to the hairstyle can be reflected quickly. For example, by keeping all of the hairstyles in memory, changes to hair color can be reflected quickly. All of the thumbnails representing the hairstyles can be quickly recomputed based on the change in hair color.

C. Thumbnail Cache

As shown in FIGS. 1B-1H, various thumbnails are displayed in accordance with a current state of the avatar. As the user scrolls through the various asset obvious, it is beneficial to see the asset options in relation to the current avatar. Therefore, an example embodiment provides a thumbnail cache so the assets can be displayed quickly with respect to the current avatar.

The content that is displayed on the user interface can be dynamically built based on the configuration file for the assets. Thumbnails are rendered dynamically as different assets are selected. As shown in FIG. 1D, since the lighter hair color is selected for the avatar, all of the thumbnail images that are displayed with different assets, are displayed with the lighter hair color that has been selected. As shown in FIG. 1D, when the darker hair color is selected for the avatar, all of the thumbnail images are displayed with different assets are displayed with the darker hair color that has been selected.

Therefore, the content that is displayed on the user interface is based on the choices that are made by the user. The thumbnails that appear on the interface are dynamic based on user actions and are not static.

In order to enable the dynamic changes to the thumbnails, optimization techniques are employed. The avatar including the assets are pre-computed or cached. Computations for rendering the asset can be done ahead of time, such as subdivision data caching. The thumbnails can be pre-compiled and subdivision can be precomputed or partially pre-computed in order to expedite the rendering of the thumbnails. Since assets have been pre-computed or cached, when the user selects a particular asset, less time is required to completely reference the asset. For example, if the user selects the feature "hair," a plurality of different hairstyles (assets) are pre-computed on the current avatar the feature "hair."

In an example embodiment, when a user selects a particular head shape, features and assets that can be selected can be displayed in thumbnails. As shown in FIGS. 1G and 1H, the thumbnails that are displayed can include customizations that have already been made by a user. Earrings thumbnails 171 are thumbnails of a current state of an avatar with different earrings options. Hat thumbnails 172 are thumbnails of a current state of an avatar with different hat options. After the avatar of the user is loaded onto the monitor, the various customization options that they user may apply to their avatar are pre-cached. When the user selects a particular asset, the possible asset options are rendered quickly. Therefore, in accordance with some example embodiments, the user can easily see how other customizations would appear on their currently designed avatar.

VI. Camera and Assets

The images that are displayed in the thumbnails can be displayed in different 3D views. The different views can be called different camera views. The camera views are three-dimensional. All of the assets that are displayed on the display, such as the thumbnails, can be displayed in accordance with the selected camera view.

FIG. 1G illustrates a user interface 170 displaying earring accessories in a profile camera view 173. FIG. 1H illustrates a user interface 180 displaying earring accessories in a close-up profile camera view. The camera views shown in FIGS. 1G and 1H are merely examples and different camera views and different camera angles can be made available to a user. A user may be provided with various camera view options. The number of views can vary based on user preferences. Example camera views can include a 3D camera view of the head from the front, a 3D camera view of the head from the back, a 3D camera view of the eyes, a 3D camera view for a chin, a 3D camera view for a nose, 3D camera view for ears, etc. All of the assets that can be selected by the user can be displayed in accordance with the selected camera view.

In accordance with example embodiments, the assets displayed in the different camera views are updated in real time in response to changes made by the user creating the avatar.

VII. Rule System

In some situations, assets may not be compatible or may clash. For example, a user may want to have a particular hairstyle, but they would also like to add a hat. However, adding a hat to a hairstyle may affect the appearance of the hairstyle. As another example, a user may want to place sunglasses over an avatar's eyes or hair. However, adding the sunglasses can affect the appearance of the eyes or hair.

Therefore, an example embodiment provides a rule system in the event of possible incompatibilities between assets. Specifically, configuration rules are configured for each combination of assets to avoid any clashes or conflicts. A universal hairline is created for the head. Different combinations of hairstyles and hats are configured in accordance with the universal hairline. All the hats can pinch at the same location on the universal hairline. For example, a bob hairstyle can configured for 50 different hats. Further, all of the hairstyles are configured so that they fall within the hairline. When a hat is placed on top of the hair, the hair that falls under the hat is compressed. Further, the hats that is placed on top of the hair can be modified to as to provide space for the hair to fall under. In addition, if a hat is placed so as to cover part of the hair, then the portion of the hair that is covered by the hat is updated accordingly. Therefore, with respect to the hair and hat example, there is a rule system for how different hairstyles will affect different hats, and there is a rule system for how different hats will affect different hairstyles.

Rules can refer to the dependencies between assets. A rule can include an identifier for an asset, dependencies, and variants. For example, when a hairstyle identified as "hair-straight_long_down_fringe" is selected, a preset ear can be overridden since the hairstyle will affect the ears. Further, a variant can be activated for headwear based on the hairstyle.

The selection of the different hats on hairstyles are displayed on thumbnails in real-time so that a user can readily see the possible options. For example, if the user has selected a particular hairstyle (e.g., bob), then all of the hats will be applied in accordance with the rules for the particular hairstyle. If, for example, the user has selected a particular hat (e.g., baseball cap) and is in the process of selecting a hairstyle, the available hairstyle options will conform to the rules of the hat. Further, the thumbnails that are displayed are dynamic in accordance with the changes made by the user. If a change is made to the avatar, then thumbnail images that are displayed will be consistent with the change made to the avatar.

VIII. Example Device

Figure 7:
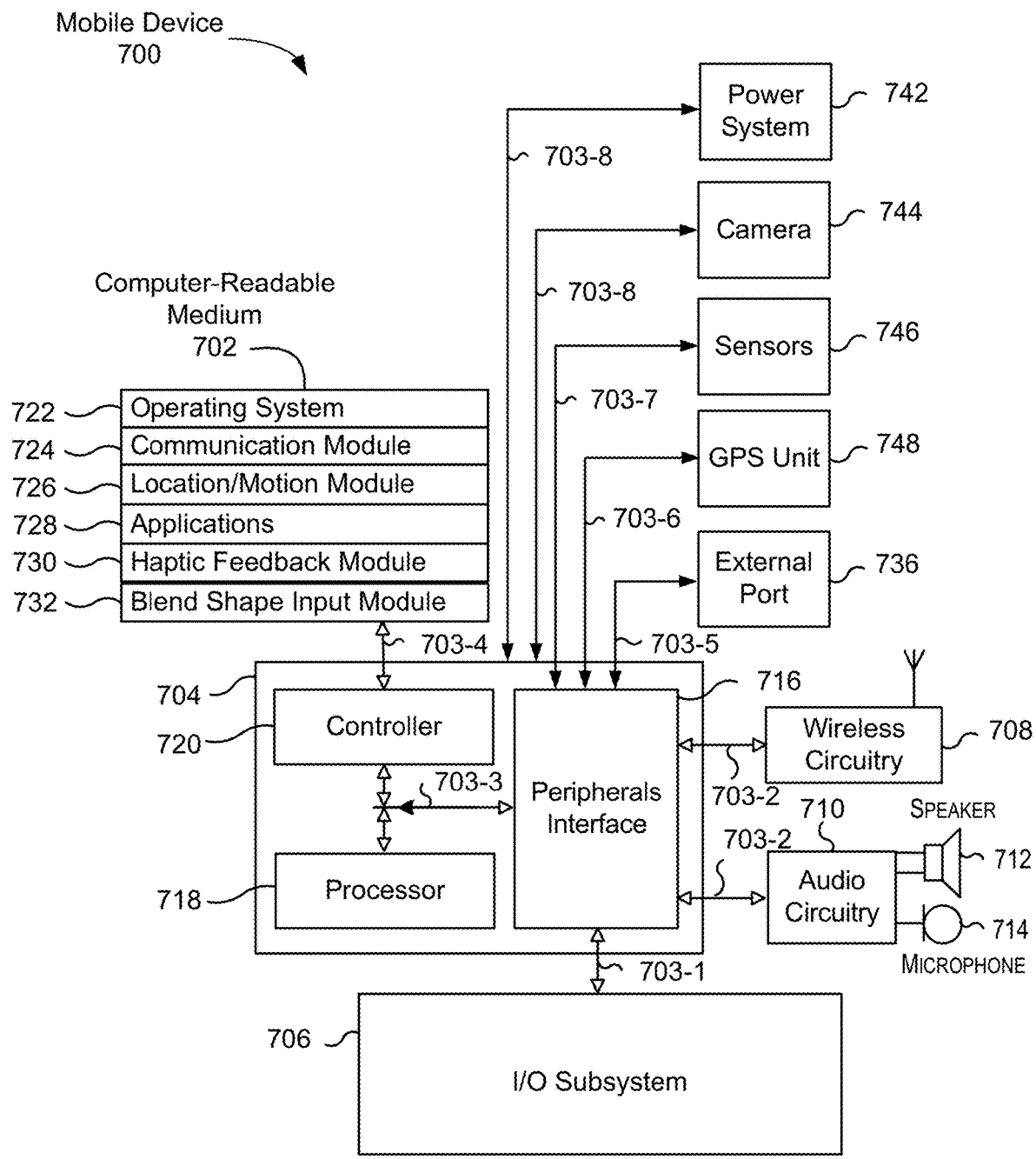
FIG. 7 illustrates a block diagram of an example device, in accordance with some embodiments.

FIG. 7 is a block diagram of an example electronic device 700. Device 700 generally includes computer-readable medium 702, a processing system 704, an Input/Output (I/O) subsystem 706, wireless circuitry 708, and audio circuitry 710 including speaker 712 and microphone 714. Computer-readable medium 702 can be a non-transitory computer-readable medium. These components may be coupled by one or more communication buses or signal lines 703. Device 700 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 7 is only one example of an architecture for device 700, and that device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 708 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 708 is coupled to processing system 704 via peripherals interface 716. Peripherals interface 716 can include conventional components for establishing and maintaining communication between peripherals and processing system 704. Voice and data information received by wireless circuitry 708 (e.g., in speech recognition or voice command applications) is sent to one or more processors 718 via peripherals interface 716. One or more processors 718 are configurable to process various data formats.

Peripherals interface 716 couple the input and output peripherals of device 700 to the one or more processors 718 and computer-readable medium 702. One or more processors 718 communicate with computer-readable medium 702 via a controller 720. Computer-readable medium 702 can be any device or medium that can store code and/or data for use by one or more processors 718. Computer-readable medium 702 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 716, one or more processors 718, and controller 720 can be implemented on a single chip, such as processing system 704. In some other embodiments, they can be implemented on separate chips.

Processor(s) 718 can include hardware and/or software elements that perform one or more processing functions, such as mathematical operations, logical operations, data manipulation operations, data transfer operations, controlling the reception of user input, controlling output of information to users, or the like. Processor(s) 718 can be embodied as one or more hardware processors, microprocessors, microcontrollers, field programmable gate arrays (FPGAs), application-specified integrated circuits (ASICs), or the like.

Device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 700 includes a camera 744. In some embodiments, device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location. In some embodiments, device 700 can include a GPS receiver, sometimes referred to as a GPS unit 748. A mobile device can use a satellite navigation system, such as the Global Positioning System (GPS), to obtain position information, timing information, altitude, or other navigation information. In some embodiments, device 700 can include external port 736 (e.g., USB, FireWire, Lightning connector, 110-pin connector, etc.). External port 736 can be adapted for coupling directly to other devices or indirectly over a network (e.g., the Internet, wireless LAN, etc.).

One or more processors 718 run various software components stored in computer-readable medium 702 to perform various functions for device 700. In some embodiments, the software components include operating system 722, communication module (or set of instructions) 724, location and motion module 726, other applications (computer products, sets of instructions, etc.) 728, and haptic feedback module 730 and blend shape input module 732. Operating system 722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 724 facilitates communication with other devices over external port 736 or via wireless circuitry 708 and includes various software components for handling data received from wireless circuitry 708 and/or external port 736.

The one or more applications 734 on device 700 can include any applications installed on the device 700, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

The state information 728 can include a power state or mode of operation collected about one or more components of device 700. State information 728 can include a power state or mode of operation of components of other devices obtained by device 700. As the mobile device or the companion device, device 700 can generate local state information and remote state information in state information 738. Device 700 (e.g., using wireless circuitry 708) can use state information 728 to manage operations locally in order to reduce power usage. Device 700 can synchronize all or part of the local state information in state information 728 with the other devices. The other devices can delay sending messages to device 700 allowing processors 718 to remain in a sleep state further reducing power consumption.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 706 can include a display and user input devices such as a keyboard, mouse, and/or trackpad. In some embodiments, I/O subsystem 706 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 706 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of a mobile device (e.g., a wrist-worn device) and/or a companion device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. As used herein, a processor includes a single-core processor, multi-core processor on a same integrated chip, or multiple processing units on a single circuit board or networked. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although specific example embodiments have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

As described above, one aspect of the present technology is the gathering and use of data available from various sources in order to generate an avatar. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide customized avatar options that is of greater interest to the user. Accordingly, use of such personal information data can enable users to have more personally customized avatars. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suggested customizations can be selected and delivered to users by inferring preferences based on non-personal information data or a bare minimum amount of personal information, such as the content being requested by the device associated with a user, other non-personal information available to the avatar application, or publicly available information.

Further, while example embodiments have been described using a particular combination of hardware and software, it should be recognized that other combinations of hardware and software are also within the scope of the example embodiments. Some of the example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

All patents, patent applications, publications, and descriptions mentioned herein are incorporated by reference in their entirety for all purposes. None is admitted to be prior art.

What is claimed is:

1. A method comprising:
    storing, by a mobile device, a plurality of assets and a plurality of blend shapes corresponding with the plurality of assets for a plurality of features of an avatar, wherein the plurality of assets are defined for a same rig;
    receiving, on a user interface of the mobile device, a selection of a first feature from among the plurality of features;
    identifying a first set of the plurality of assets for the same rig that corresponds to the first feature;
    receiving, on the user interface of the mobile device, a selection of a first asset among the first set of the plurality of assets corresponding to the first feature;
    identifying a first set of the plurality of blend shapes corresponding to the first asset of the first feature that is selected among the first set of the plurality of assets corresponding to the first feature;
    receiving, on the user interface of the mobile device, a selection of a second asset of the first feature among the first set of the plurality of assets corresponding to the first feature; and
    identifying a second set of the plurality of blend shapes corresponding to the second asset of the first feature that is selected among the first set of the plurality of assets corresponding to the first feature,
    wherein one or more blend shapes of the first set of the plurality of blend shapes for the first asset of the first feature overlaps with one or more blend shapes of the second set of the plurality of blend shapes for the second asset of the first feature.

2. The method according to claim 1, wherein the avatar is a representation of a head.

3. The method according to claim 1, wherein the storing the plurality of assets and the plurality of blend shapes corresponding with the plurality of assets for the plurality of features comprises:
    identifying the first asset among the first set of the plurality of assets corresponding to the first feature;
    obtaining 3D geometry for the first asset among the first set of the plurality of assets corresponding to the first feature;
    compressing the 3D geometry for the first asset;
    identifying the first set of the plurality of blend shapes corresponding to the first asset that is selected among the first set of the plurality of assets corresponding to the first feature; and
    storing offset values for the first set of the plurality of blend shapes corresponding to the first asset.

4. The method according to claim 1, wherein a same blend shape is used for the one or more blend shapes of the first set of the plurality of blend shapes for the first asset that overlaps with one or more blend shapes of the second set of the plurality of blend shapes for the second asset.

5. The method according to claim 1, further comprising:
    receiving a modification to the first asset in the first set of the plurality of assets corresponding to the first feature;
    determining whether there is a second asset in a second set of the plurality of assets of a second feature that corresponds with the first asset in the first set of the plurality of assets corresponding to the first feature;
    in response to determining that there is the second asset in the second set of the plurality of assets of the second feature corresponding with the first asset in the first set of the plurality of assets corresponding to the first feature, calculating a corrective shape for the second asset, wherein the corrective shape is an offset of a blend shape of the second asset;
    updating the second asset in the second set of the plurality of assets of the second feature to correspond with the modification to the first asset in the first set of the plurality of assets corresponding to the first feature in accordance with the corrective shape; and
    displaying the modified first asset in the first set of the plurality of assets corresponding to the first feature and the updated second asset in the in the second set of the plurality of assets of the second feature.

6. The method according to claim 1, further comprising:
    retrieving the first set of the plurality of blend shapes from a persistent memory;
    storing the retrieved first set of the plurality of blend shapes to a working memory;
    simulating a first expression of the avatar based on the first set of the plurality of blend shapes;
    retrieving the second set of the plurality of blend shapes from the persistent memory, wherein only blend shapes of the second set of the plurality blend shapes that are not already in the working memory are retrieved from persistent memory;
    storing the retrieved second set of blend shapes to working memory; and
    simulating a second expression of the avatar based on the second set of blend shapes.

7. The method according to claim 6, wherein one or more blend shapes in the first set of blend shapes that are not shared with one or more blend shapes in the second set of blend shapes are moved from the working memory to the persistent memory.

8. The method according to claim 6, wherein the simulating the first expression of the avatar based on the first set of blend shapes comprises determining a linear combination of the first set of blend shapes for the first asset and a default shape for the first asset using an input position of the avatar.

9. The method according to claim 1, wherein the second asset in the first set of the plurality of assets of the first feature corresponds with the first asset in the first set of the plurality of assets corresponding to the first feature in response to the second asset being active on the first feature of the avatar at a same time as the first asset in the first set of the plurality of assets of the first feature.

10. The method according to claim 5, wherein the corrective shape is an offset value between 0 to 1.0.

11. The method according to claim 1, further comprising:
    generating a plurality of zones on the avatar, wherein the plurality of zones correspond to dynamic particles on the avatar;

determining a first set of zones of the plurality of zones corresponding with the first asset in the first set of the plurality of assets corresponding to the first feature; and identifying a plurality of blend shapes for the first set of zones, wherein the plurality of blend shapes for the first set of zones corresponds to a direction of movement for each of the zones in the first set of zones.

12. The method according to claim 11, wherein the dynamic particles on the avatar correspond to predetermined areas of motion on the avatar.

13. The method according to claim 11, further comprising:

determining a second set of zones of the plurality of zones corresponding with the second asset in the first set of the plurality of assets corresponding to the first feature; and generating a plurality of blend shapes for the second set of zones, wherein the plurality of blend shapes for the second set of zones include a plurality of degrees of movement for each of the zones in the second set of zones, wherein one or more blend shapes of the plurality of blend shapes for the first set of zones overlaps with one or more blend shapes of the plurality of blend shapes for the second set of zones.

14. The method according to claim 11, wherein the direction of movement corresponds to one from a group consisting of an up movement, a down movement, a left movement, a right movement, a forward movement, and a backward movement.

15. The method according to claim 4, wherein the first feature is hair and the first asset in the first set of the plurality of assets is a hairstyle.

16. The method according to claim 1, further comprising:

in response to initiating an application for generating the avatar, determining a plurality of features and a plurality of assets corresponding to the plurality of features most frequently used by a user;

pre-computing the plurality of assets corresponding to the plurality of features most frequently used by the user; and caching the pre-computed plurality of assets corresponding to the plurality of features.

17. The method according to claim 16, wherein the plurality of features most frequently used by the user is based on a history of user interaction with the application.

18. The method according to claim 16, wherein in response to the user selecting an asset from the pre-computed plurality of assets corresponding to the plurality of features, completing rendering of the selected asset.

19. A mobile device comprising:

one or more processors and a memory, wherein the one or more processors are configured to:

store a plurality of assets and a plurality of blend shapes corresponding with the plurality of assets for a plurality of features of an avatar, wherein the plurality of assets are defined for a same rig;

receive a selection of a first feature from among the plurality of features;

identify a first set of the plurality of assets for the same rig that corresponds to the first feature;

receive a selection of a first asset among the first set of the plurality of assets corresponding to the first feature;

identify a first set of the plurality of blend shapes corresponding to the first asset of the first feature that is selected among the first set of the plurality of assets corresponding to the first feature;

receive a selection of a second asset of the first feature among the first set of the plurality of assets corresponding to the first feature; and identify a second set of the plurality of blend shapes corresponding to the second asset of the first feature that is selected among the first set of the plurality of assets corresponding to the first feature, wherein one or more blend shapes of the first set of the plurality of blend shapes for the first asset of the first feature overlaps with one or more blend shapes of the second set of the plurality of blend shapes for the second asset of the first feature.

20. The mobile device according to claim 19 wherein the storing the plurality of assets and the plurality of blend shapes corresponding with the plurality of assets for the plurality of features comprises one or more processors configured to:

identify the first asset among the first set of the plurality of assets corresponding to the first feature;

obtain 3D geometry for the first asset among the first set of the plurality of assets corresponding to the first feature;

compress the 3D geometry for the first asset;

identify the first set of the plurality of blend shapes corresponding to the first asset that is selected among the first set of the plurality of assets corresponding to the first feature; and store offset values for the first set of the plurality of blend shapes corresponding to the first asset.

21. A non-transitory computer readable medium including instructions configured to cause one or more processors to perform operations comprising:

storing a plurality of assets and a plurality of blend shapes corresponding with the plurality of assets for a plurality of features of an avatar, wherein the plurality of assets are defined for a same rig;

receiving a selection of a first feature from among the plurality of features;

identifying a first set of the plurality of assets for the same rig that corresponds to the first feature;

receiving a selection of a first asset among the first set of the plurality of assets corresponding to the first feature;

identifying a first set of the plurality of blend shapes corresponding to the first asset of the first feature that is selected among the first set of the plurality of assets corresponding to the first feature;

receiving a selection of a second asset among the first set of the plurality of assets corresponding to the first feature; and identifying a second set of the plurality of blend shapes corresponding to the second asset of the first feature that is selected among the first set of the plurality of assets corresponding to the first feature, wherein one or more blend shapes of the first set of the plurality of blend shapes for the first asset of the first feature overlaps with one or more blend shapes of the second set of the plurality of blend shapes for the second asset of the first feature.

22. The method according to claim 1, wherein the first set of the plurality of blend shapes corresponding to the first asset of the first feature and the second set of the plurality of blend shapes corresponding to the second asset of the first feature are generated from a default mesh.

* * * * *

UNITED STATES PATENT AND TRADEMARK OFFICE
CERTIFICATE OF CORRECTION

Page 1 of 1

PATENT NO. : 10,796,470 B2
APPLICATION NO. : 16/283610
DATED : October 6, 2020
INVENTOR(S) : Nicolas V. Scapel et al.

It is certified that error appears in the above-identified patent and that said Letters Patent is hereby corrected as shown below:

In the Claims

Column 30, Line 27, Claim 5: please delete the first instance of "in the".

Signed and Sealed this
Fifteenth Day of December, 2020

Andrei Iancu
*Director of the United States Patent and Trademark Office*